Figure 1:
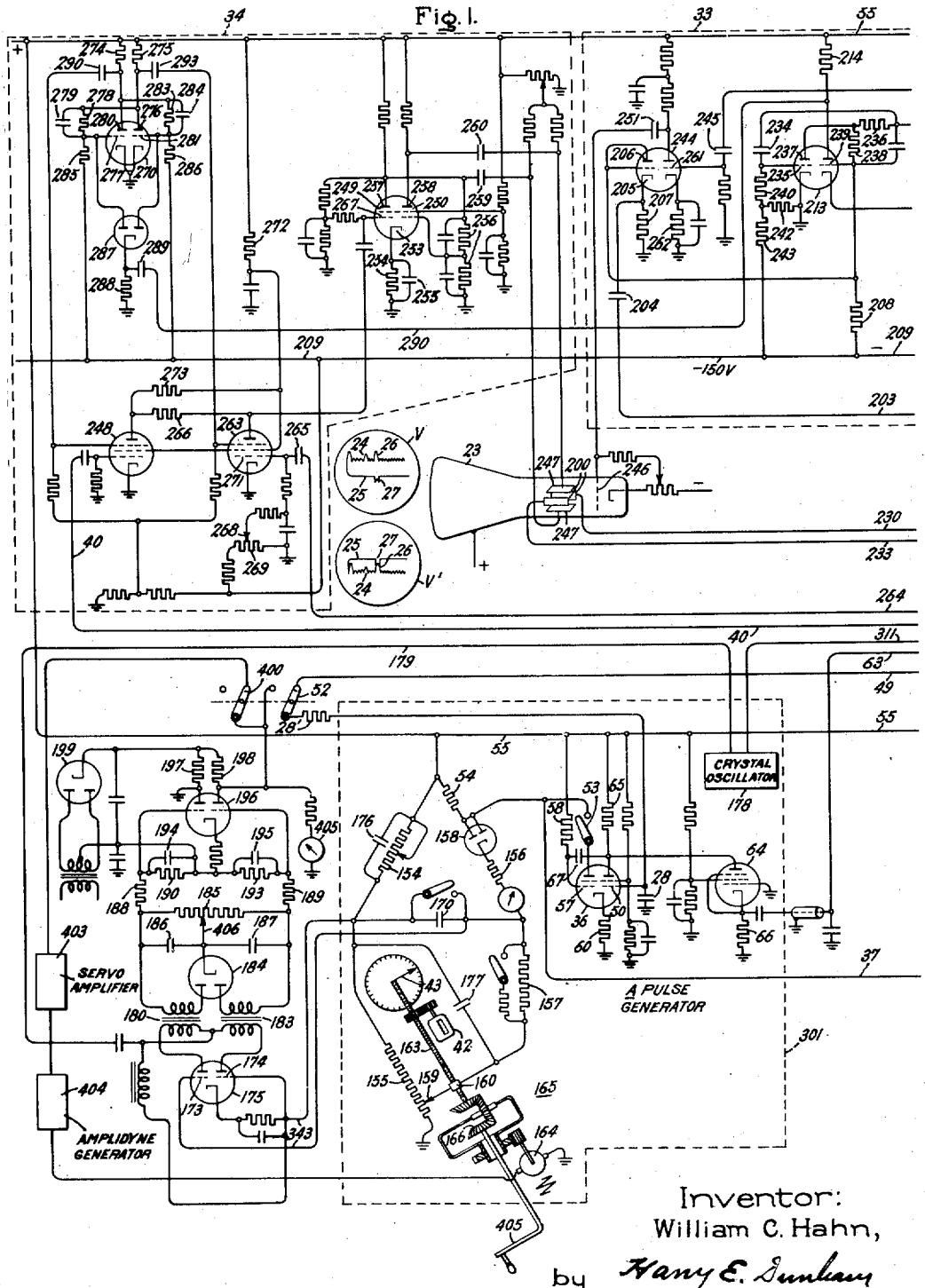

April 12, 1949.  W. C. HAHN  2,467,208
PULSE-ECHO SYSTEM

Filed Dec. 30, 1943  3 Sheets-Sheet 1

Inventor:
William C. Hahn,
by Harry E. Dunham
His Attorney.

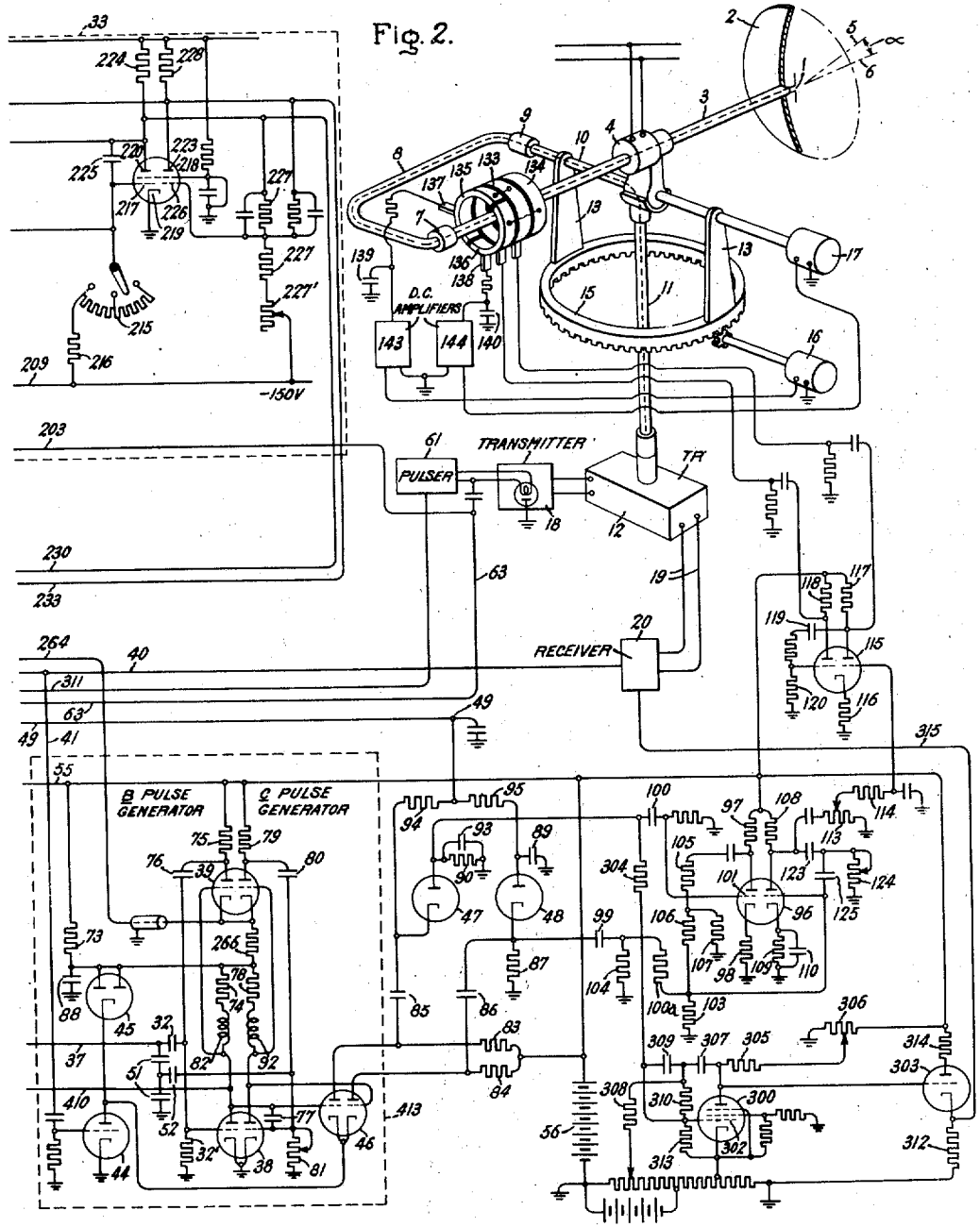

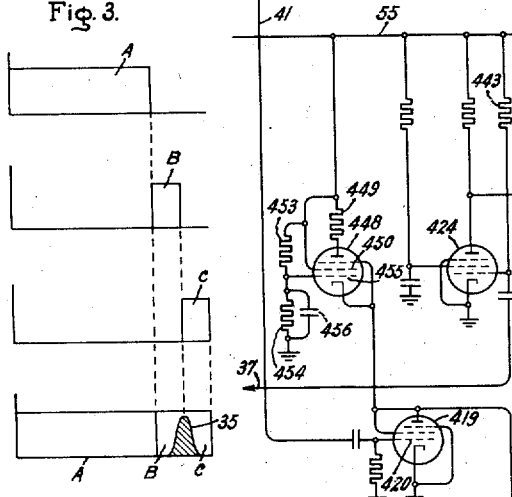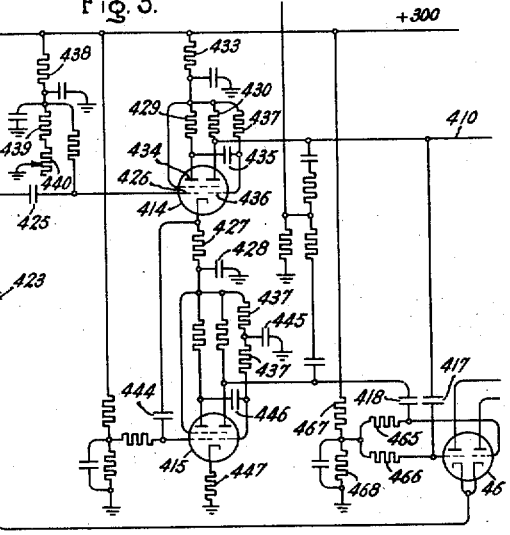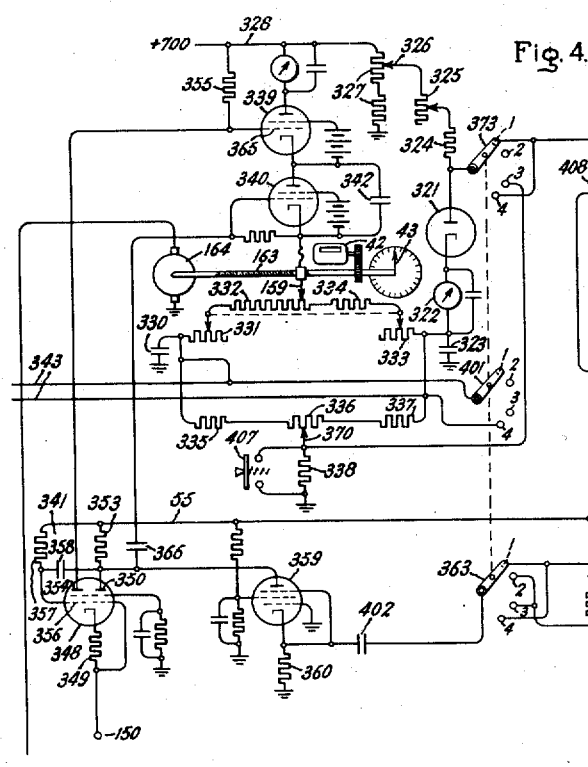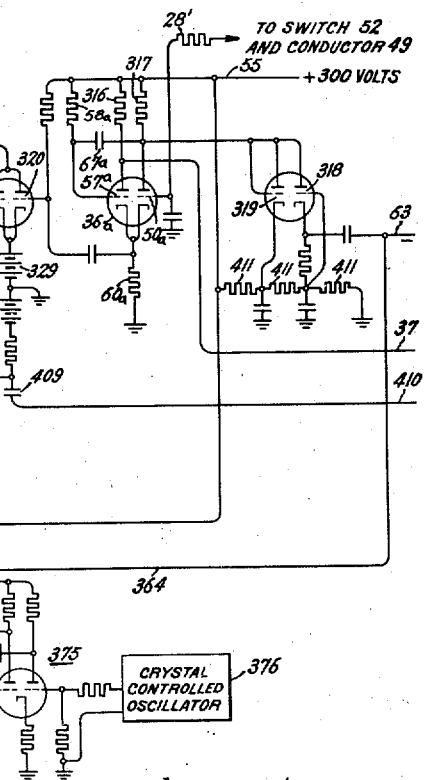

Patented Apr. 12, 1949

2,467,208

UNITED STATES PATENT OFFICE 2,467,208

PULSE ECHO SYSTEM

William C. Hahn, Scotia, N. Y., assignor to General Electric Company, a corporation of New York Application December 30, 1943, Serial No. 516,239

37 Claims. (Cl. 343—7)

My present application is a continuation-in-part of my parent application Serial No. 400,080, filed June 27, 1941, entitled "Impulse systems" and which is assigned to the assignee of my present application.

In that application is disclosed a radio detection and ranging system in which radiated pulses are received after reflection from remote objects and in which a particular one of the received echoes is selected and utilized to produce an indication of the range to the object producing the selected echo. This affords the important advantage that noise effects which occur at times other than during the selected echo do not affect the operation of the range indicating equipment.

Further means are employed for indicating all of the received echoes upon the viewing screen of a cathode ray device in space sequence corresponding to the time sequence in which the echoes are received and for identifying on said screen the particular indication produced by the selected echo.

My present application has for its object to effect certain improvements in the invention of my above referred to application both with respect to the means whereby the indication of range of the object producing the selected echo is produced and with respect to identification of the selected echo upon the viewing screen of the cathode ray device.

A further object of my present invention is to effect certain improvements in means for producing a continuous indication of range to the object producing the selected echo during movement of said object throughout the range of the equipment.

A still further object of my invention is to provide improved means for maintaining the antenna of the system directed at the object producing the selected echo throughout its movements.

Various other objects of my present invention will appear as the description thereof proceeds.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Figs. 1 and 2 taken together represent an embodiment of my invention, Fig. 3 represents certain characteristics pertaining to its operation, and Figs. 4 and 5 represent modifications of portions of the system of Figs. 1 and 2.

Referring first to Figs. 1 and 2 I have represented in the upper right-hand corner of Fig. 2 at 1 an antenna arranged within a parabolic reflector 2 and adapted to be rotated about the axis of the shaft 3 by means of a motor 4 mounted on the shaft. This antenna 1 and parabola 2 are arranged to project a beam of waves in a direction 5 extending at a small angle $\alpha$ to the axis about which the rotation takes place. I shall call this direction 5 the axis of directivity of the antenna, and the direction 6 of the axis of the shaft 3 the direction of orientation of the equipment. The arrangement is such that upon rotation of the antenna 1 about the axis of the shaft 3 the direction 5 rotates about the axis 6 to transcribe the surface of a cone.

This antenna 1 is illustrated as connected through a transmission line which extends along the axis of the shaft 3, thence through a rotating joint 7, connecting member 8, rotating joint 9, horizontal shaft 10 at right angles to the shaft 3, and thence downward through a vertical shaft 11 to equipment represented by a cube 12.

The shaft 3 is mounted for rotation in a vertical plane about the horizontal shaft 10 the latter of which is mounted for rotation in suitable supports 13 on a ring gear 15. This ring gear is arranged to be driven by a motor 16 for rotation of the antenna in the horizontal plane. A second motor 17 is arranged upon the shaft 10 for rotation of the antenna in the vertical plane.

It will of course be understood that all of the equipment thus far described is indicated extremely schematically for the purpose of clearness of explanation and is not intended to represent any specific mechanical form of the apparatus. This apparatus of course may take widely varying forms in practicing my invention.

The equipment 12 may comprise what is commonly known as a TR box. It comprises equipment through which high intensity pulses to be radiated are supplied from a transmitter 18 to the transmission line extending through the shafts 11, 10, 8, and 3 to the antenna to be radiated. Pulses received upon the antenna are also supplied through the transmission line extending through these shafts to the equipment 12 and thence over conductors 19 to a receiver 20. The equipment 12 includes means to protect the receiving equipment 20 from the intense pulses produced by the transmitter 18 and also to prevent dissipation of impulses intercepted by the antenna in the output circuit of the transmitting equipment.

In Fig. 1 a cathode ray device 23 is shown having a fluorescent screen on the left-hand end thereof on which appears the indications to be produced. This screen is represented by the circle at the left of device 23. It will be seen that the indications comprise two horizontal lines 24 and 25. The equipment presently to be described comprises means for deflecting the ray of the oscillograph horizontally across the screen, first along the line 24 and then along the line 25, and so on alternately. When deflected along the line 24 the beam is modulated in the vertical direction by the received echoes. When deflected along the line 25 it is modulated in the vertical direction by a marker pulse generated in the equipment and which is utilized to identify a particular echo on the screen. This particular echo may be one which the equipment presently to be described selects and to which it responds to produce an indication of range to the remote object producing this particular echo. For example, this echo may be represented by the vertical deflection 26 from the line 24 representing a particular remote object and this object may be identified by the downward deflection 27 from the lower line 25, this downward deflection being produced by a locally generated pulse which is made to occur synchronous with receipt of the echo from the particular object. As this object varies in range these two deflections 26 and 27 move in unison across the screen in accord with the variations in range.

The equipment for producing the horizontal deflection of the beam of the cathode ray oscillograph is represented in Figs. 1 and 2 within the dotted rectangle 33. The mechanism for producing the deflections of the beam in the vertical plane alternately in accord with the echoes and the locally generated target marker pulse is represented in Fig. 1 within the dotted enclosure 34. The received echo pulses are supplied to this equipment 34 from the receiver over a conductor 40.

These received echo pulses are also supplied over a conductor 41 to a receiving tube 44 connected in series with a further receiving tube 46 in the lower portion of Fig. 2. This equipment in the lower portions of Figs. 1 and 2 comprises equipment for selecting from the train of echo pulses, which is received after each radiated pulse, a particular pulse and for identifying that pulse on the screen as by the deflection 27, and producing from that pulse a continuous indication of the range of the object from which that particular echo pulse is received. This range is indicated by the counter 42 and index 43 shown in the lower central portion of Fig. 1. This equipment also comprises means for controlling the orientation of the axis 6 to maintain it directed at the object producing the particular echo selected by the equipment from the train of received echo pulses.

This equipment comprises equipment for generating locally three pulses in succession, as described in my above referred to parent application, the first or A pulse having a varying length corresponding to the range to the remote target and serving to maintain the receiving tube 46 ineffective throughout its duration. This A pulse is generated by electron discharge device 36 and is supplied over conductor 37 to device 38.

The second and third, or B and C, pulses, which I shall refer to as aperture or gate pulses, are of equal fixed length and they render the respective triodes in discharge device 46 operative during these respective pulses to pass current of magnitude determined by the echo pulses applied to the control electrode of device 44. The B aperture pulse is generated by the left-hand triodes in discharge devices 38 and 39 and renders operative the left-hand triode in discharge device 46. The C aperture pulse is generated by the right-hand triodes in devices 38 and 39 and renders operative the right-hand triode in device 46 to pass current of magnitude controlled by the echo applied to device 44. These generators of the A, B and C pulses each comprise a multivibrator, the three multivibrators being connected in cascade for generation of the different pulses in succession.

The equipment comprising diodes 47 and 48 integrates the current passed by the respective triodes in device 46 to produce a potential on conductor 49 which controls the length of the A pulses to maintain the time of occurrence of the B and C pulses such that the selected echo is received equally during the two pulses.

In the right-hand portion of Fig. 2 is shown equipment which responds to the echo selected by device 46 during the B and C pulses to control the orientation of the axis 6 to maintain it directed at the object from which the particular echo is received.

In Fig. 3 I have shown the succession of pulses A, B and C. The pulse A begins simultaneously with, or is initiated by, the pulse radiated by the transmitter and is of a length dependent upon the distance to the remote target. Upon its termination, aperture pulse B is generated as indicated by the rectangle designated B in Fig. 3. On termination of pulse B, an additional aperture pulse C is generated as represented by the rectangle designated C in Fig. 3. These pulses A, B and C are represented in end-to-end relationship on the lower line of Fig. 3. Receiving discharge device 46 is rendered operative only during pulses B and C.

The curved line 35 represents an echo which occurs during pulses B and C. This echo is integrated in the equipment comprising the diodes 47 and 48 to produce a voltage on conductor 49 having an intensity and polarity dependent upon the relative proportions of this echo received during pulses B and C and that voltage is supplied to the discharge device 36 of the A pulse generator to control the duration of the A pulse to render the receiver 46 operative, that is, to maintain the time of occurrence of aperture pulses B and C, at a time such that the echo 35 is equally divided by these two aperture pulses B and C.

Having thus generally indicated the character of the equipment to be described, I shall now proceed with a more detailed description of its operation.

The A pulse generator

The A pulse generator comprises the discharge device 36 which has a cathode and two associated anodes each separated from the cathode by a control electrode and a screen electrode. The left-hand anode of this device is connected through a switch 53 and a resistance 54 to bus 55, which is connected to the positive side of a source of operating potential 56. This source may be of 300 volts. The control electrode 57 of device 36 is likewise connected through a resistance 58 to the positive bus 55. Thus the left side of the discharge device 36 is normally conducting and current flows from the anode to the cathode and to ground through the cathode resistance 60. The potential on resistance 60 is sufficient to render the cathode of this device positive with respect to the control electrode 50 and thus the right side of the discharge device is non-conducting. This is the normal condition of the device when operating potential is first applied to the equipment.

During operation of the transmitter 18, pulses are supplied from the pulser 61, which is used to key the transmitter 18, over conductor 63 to the cathode of device 64 driving that cathode negative and causing current to flow in this device 64. These pulses are derived from the output of pulses 61 and thus agree in time with the pulses generated by transmitter 18, which is keyed thereby, and agree in time with pulses actually radiated by the antenna 1.

This current in device 64 flows through resistance 65 and device 64. The drop in potential on resistance 65 reduces the anode potential on the right-hand anode of device 36. This anode is connected to the control electrode 57 through a condenser 67 and thus the control electrode 57 is driven negative sufficiently to interrupt current flowing in the left-hand anode of this device. This interrupts the current flowing in resistance 60 and removes the bias from the right-hand side of this device permitting that device to pass current through its right-hand anode. Current flowing in resistance 65 and device 36 through resistance 60 produces a negative bias between the cathode and the grid 57, which maintains the left-hand side of this device non-conducting for the duration of the A pulse, its grid being held strongly negative by the charge on condenser 67. This is the beginning of the A pulse. Conductor 37 is at high positive potential.

The A pulse is terminated when the charge on condenser 67 leaks off sufficiently to permit the left-hand side of device 36 to pass current. This current, flowing in resistance 60, interrupts the flow of current in the right-hand side of the device 36, which increases the potential of the right-hand anode thus rendering the grid 57 strongly positive. Large current then flows in the left side of device 36 lowering its anode potential and the potential on conductor 37. This is the termination of the A pulse.

The duration of the A pulse is determined by the potential on the control electrode 50 of device 36. This is true because the magnitude of current flowing in the right-hand side of device 36 and in resistance 65 determines the magnitude of drop in voltage on the right-hand anode of device 36 and therefore determines the extent to which grid 57 is driven negative by action of condenser 67. This, in turn, determines the extent to which condenser 67 must discharge before the left-hand side of device 36 becomes conducting to terminate the A pulse. The time required for this discharge of condenser 67 is dependent upon the extent of discharge required and is thus dependent upon the potential of control electrode 50.

The potential of this control electrode is controlled by the integration equipment comprising diodes 47 and 48 to which it is connected through switch 52 and conductor 49. That operation will later be described.

*The B and C pulse generators*

During the A pulse both triodes of device 38 are conducting, current flowing therein through respective resistances 74 and 78 and resistance 73 common thereto. The potentials on resistances 74 and 78 are supplied between the respective cathodes and control electrodes of device 38 and are sufficient to render both triodes in device 38 nonconducting.

Upon termination of the A pulse, when conductor 37 drops in potential the left-hand grid of device 38 is driven negative relative to its cathode thereby interrupting the current through the left-hand portion of device 38 and resistance 74. The left-hand anode of device 38 thus rises in potential driving the left-hand grid of device 39 positive causing current to flow through resistance 75, and the left-hand side of device 39. This current is of but one microsecond duration and tends to charge condenser 88. The potential on resistance 75 drops the potential on the left-hand anode of device 39, and since that anode is connected through condenser 76 to the left-hand grid of device 38 it maintains that grid negative throughout the one microsecond duration of the B aperture pulse. This is the condition established upon initiation of the B aperture pulse.

This condition continues until condenser 76 has discharged sufficiently that the potential on the left-hand grid of device 38 is varied in a positive direction until that device becomes conducting. When that occurs, the initial condition is restored, that is, current flows through resistance 74 and the left-hand side of device 38 and the potential on the resistance 74 drives the grid of device 39 negative relative to the cathode and thus interrupts the current in that device. This is the termination of the B aperture pulse.

During the B aperture pulse condenser 77, which is connected between the left-hand anode of device 38 and the right-hand grid, accumulates a charge. Upon termination of the B aperture pulse the potential on this left-hand anode drops and, due to the charge in condenser 77, the right-hand grid is driven negatively sufficiently to interrupt current in the right-hand side of device 38. This interrupts the current in resistance 78 and thus the potential on the right-hand anode of device 38 and on the right-hand grid of device 39 rises, the latter causing the right-hand side of device 39 to become conducting. The drop in potential on resistance 79 is supplied through condenser 80 to the right-hand control grid of device 38 maintaining that grid negative for the duration of the C aperture. The C aperture is terminated by the charge on condenser 80 leaking off to such a point that the right-hand portion of device 38 again becomes conducting. When this happens current again flows in resistance 78 and potential on the right-hand anode of device 38 and the right-hand grid of device 39 drops restoring the initial condition. This is the termination of the C aperture pulse.

It will be observed that conductor 37 is connected not only to the left-hand grid of device 38 through condenser 32 but it is also connected to the right-hand grid through capacity attenuator 51 and condenser 52. The left-hand anode of device 38 is capacitively coupled through condenser 77 to this right-hand control electrode. Potential variations on conductor 37 during the A pulse are amplified and reversed in phase by the left-hand section of device 38 and supplied to the right-hand control electrode. These variations are applied to this control electrode through condenser 52 directly, the variations applied through these two paths opposing each other. In this way the right-hand section of device 38 is not affected by variations on conductor 37, either at the beginning or termination of the A pulse.

By variation of resistance 81 the time required for discharge of condenser 80 sufficient to render device 38 conductive, and the duration of the C aperture may be varied. In this way the C aperture may be adjusted for equality of duration with the B aperture.

Certain features of the B and C pulse generators, shown in Fig. 2 and described above, are more particularly claimed in my copending application Serial No. 792,900, filed December 20, 1947, for "Short pulse generator," which is a division of the present application and assigned to the same assignee.

Echo selection

It will be seen that the potential on the left-hand anode of device 38 rises during the B aperture and that on the right-hand anode rises during the C aperture. These two anodes are connected to the respective grids of the two triodes in device 46. These triodes are rendered conductive only during the B and C apertures respectively and thus respond only to the selected echo, i. e., the echo which is received during these apertures.

The anodes of these triodes are connected through respective resistors 83 and 84 to the positive terminal of the source of potential, and the cathodes thereof are connected to the cathode of diode 45, to the anode of device 44 and through device 44 to ground. The received train of echoes are applied over conductor 41 to the grid of device 44 which is in series with device 46. Thus the left side of this device 46 becomes conducting during the B aperture and the right side during the C aperture, each side passing pulses of current through the respective resistors 83 and 84 of magnitude dependent upon the echo potential which is supplied to the control electrode of the device 44 during the respective apertures. Thus any echo pulse which occurs during the B and C apertures affects the potentials on the resistances 83 and 84 respectively.

Since these apertures B and C are very short, as, for example, of one microsecond duration corresponding to 164 yards' range, the echo produced by a desired remote object is selected from the received train of echo pulses and is utilized to affect the potentials on resistances 83 and 84 in proportion to the amount of the selected echo which is received during the respective B and C aperture pulses.

The variations in current in resistances 83 and 84 are produced by the echo acting on the control electrode of the single discharge device 44. This is advantageous in that it obviates the necessity for carefully balancing two discharge devices to which the echo may be applied during the different aperture pulses B and C.

It is desirable, however, that this device 44 operate under substantially the same load conditions during the B and C apertures that it does at other times and particularly during the A pulse. For this reason diode 45 is employed which passes current from the positive bus 55 through resistance 73 to device 44 during the times when device 46 is nonconducting. Diode 45 preferably is one having small drop in potential between its anodes and cathode when conducting and resistance 73 is proportioned to produce desired operating voltage for device 38. In this way device 44, for all practical purposes, operates under the same load conditions at all times. The current flowing in it, however, is transferred from the diode 45 to device 46 whenever a positive aperture pulse is applied to either of the electrodes of device 46 by reason of interruption of current in the corresponding triode of device 38 and in the associated anode resistance 74 or 78. When this occurs the respective control electrode of device 46 rises to the potential of the anode of diode 45, the cathode of which is connected directly to the cathode of device 46. Since the device 46 is one which becomes conducting when its control electrode is still negative with respect to the cathode, the cathode of device 45 must be positive with respect to its anode and this device is therefore rendered nonconducting by either the B or C aperture pulse.

It is of course important to the accuracy of the range indication that equal echoes received on device 44 during the B and C apertures equally affect the potential variations on resistances 83 and 84 since it is these potential variations which determine the range indication. It is therefore desirable that all of the current flowing in device 44 flow in the respective anodes of device 46 during the B and C apertures thereby to control the potential on resistances 83 and 84. For that reason it is important that diode 45 be nonconducting during the B and C apertures.

It is also important that flow of grid current in either of the grids of device 46 be avoided since this current flows in the device 44 and not in the anodes of device 46. Such grid current may be unequal in the two grids of the same tube and may vary from tube to tube as replacements are required.

The absence of grid current in device 46 is assured by the fact that this device has the same characteristics as device 44 and that it operates at a higher anode potential than device 44. Device 44 operates at zero grid bias. Since the anode potential of device 46 is higher, a negative bias must be applied between its grid and cathode to produce current therein equal to that in device 44. This is effected by properly proportioning resistance 73. Since the grids of device 46 are negative relative to the cathodes, flow of grid current therein cannot occur.

It is also important to the production of equal potential variations on resistance 83 and 84 in response to equal echoes received in the B and C apertures that the switching from the B aperture to the C aperture be effected as rapidly as possible. The rapidity of this switching action is increased by inductances 82 and 92 in the respective anode circuits of device 38. Change of current in either anode of device 38 produces an inductive voltage surge on the respective inductance 82 or 92 increasing the rate of change in voltage on the respective anode of device 38 thereby tending to square the pulses applied to the control electrodes of device 46. Theoretically the anode circuits of device 38 should be proportioned to be critically damped.

Integrating equipment

Diodes 47 and 48 are connected in circuits which integrate the pulses which appear on resistances 83 and 84 during the respective B and C apertures. The left-hand terminals of these resistances 83 and 84 are connected through respective condensers 85 and 86 to the cathodes of the two diodes 47 and 48 respectively. The cathode of diode 48 is also connected to ground through a resistance 87 and the anode thereof is connected to ground through a condenser 89. The anode of device 47 is connected to ground through a resistance 90 shunted by a condenser 93. Condensers 85 and 89 are of equal capacity, each being of about 500 micromicrofarads. Condensers 86 and 93 are also of equal capacity and relatively much larger, each being of about .02 to .1 microfarad. The cathode of the diode 47 is connected through resistances 94 and 95 to the anode of the diode 48, and the point intermediate these resistances is connected through the conductor 49 to the control electrode 50 of the device 36 in the A pulse generator.

In the operation of this integrator 47, 48, when the potential on the left-hand anode of device 46 drops during the B pulse, diode 47 becomes conducting and a charge is established on condensers 85 and 93 dependent upon the extent of the drop in potential on resistance 83 which, of course, depends upon the intensity of the echo received during the B pulse. Similarly during the C pulse, when the anode potential of device 46 drops, a charge is established on condensers 86 and 89 dependent in magnitude upon the intensity of the echo which occurs during the C pulse. The potential change on these condensers is principally upon condensers 85 and 89 because their capacities are very small relative to those of the respective condensers 93 and 86.

At all times other than during the B and C pulses, diodes 47 and 48 are nonconducting and the circuit elements connected to the anode of diode 47 and to the cathode of diode 48 are isolated by these diodes from the conductor 49. This conductor 49, however, is connected to a portion of the circuit which extends from the positive terminal of the source of potential 56 through resistance 83, condenser 85, resistances 94 and 95 and condenser 89 to the negative terminal of source 56. This is an alternating current circuit in which the charges on condensers 85 and 89, which are opposite in polarity, redistribute themselves upon termination of the C pulse. The elements of this circuit are so proportioned that the product of the capacitance of condenser 89 and resistance 95 is equal to the product of the capacitance 85 and the sum of the resistances 83 and 94. Thus conductor 49 is connected between two equally divided portions of this circuit and the impedances of this circuit are balanced with respect to this point 49.

The conductor 49, therefore, rises and falls in potential in accord with the difference between the charges stored in the equal condensers 85 and 89 and is not affected by the redistribution of charges in the circuit of these condensers after termination of the C pulse.

The received echoes are applied to the control electrode of device 44 in a negative sense so that this device passes larger current in the presence of weak signals than in the presence of strong signals. The result is that as the target approaches the equpment the echo during each B aperture is greater than during the C aperture with the result that the drop in resistance 83 during the B aperture is smaller than the drop in resistance 84 during the C aperture. Therefore the charge on condenser 85 increases as the target approaches. At the same time the drop in resistance 84 is greater than that in resistance 83 during successive apertures with the result that the cathode of diode 48 is driven more and more negative during the successive apertures and the charge on condenser 89 reduces as the target approaches.

The result is that as the target approaches the equipment the potential of conductor 49 approaches ground potential and may become negative with respect to ground. As the target recedes from the equipment the opposite effect is had and the potential on conductor 49 varies in the positive direction.

Viewed in another way it may be said that the current pulse flowing during the B aperture flows in the path comprising condenser 93, diode 47, condenser 85 and the left-hand triode of device 46. That flowing during the C aperture flows through condenser 89, diode 48, condenser 86 and the right-hand triode of device 46. At all other times than during the B and C apertures no current flows in the diodes 47 and 48. These unidirectional current pulses in the diodes have a value averaged over the whole time which may be thought of as a direct current. Such a direct current for the B pulse can flow only in the path comprising resistance 90, diode 47 and resistance 94 to conductor 49. The direct current for the C pulse can flow only in the path comprising resistance 87, diode 48, resistance 95 from conductor 49. These two currents in the absence of an echo, or in the presence of equal echoes in the B and C apertures, are equal and opposite and conductor 49 remains at constant potential.

These pulses of current in the B and C apertures are reduced by the received echo to an extent dependent upon the intensity of the received echoes. Thus if the echo be stronger in the B aperture than in the C aperture, less current flows from diode 47 to conductor 49 than flows from conductor 49 through diode 48 and the potential of conductor 49 drops. Thus as the target approaches the equipment, the potential of conductor 49 with respect to ground varies in the negative direction and may become negative with respect to ground. Similarly if the target recedes the potential of conductor 49 increases.

Since resistance 95 is of 100,000 ohms and resistances 94 and 83 of 50,000 each, the redistribution of the charges in the condensers 85 and 89 after each C aperture takes place in a relatively short period of the time following the C aperture without affecting the potential of conductor 49 during the redistribution. The variations in potential on conductor 49 are smoothed out, as applied to the grid 50 of the A pulse generator, by the resistance capacity filter comprising capacity 28 and resistance 28' shown in Fig. 1. Thus although the variations of potential on conductor 49 have a component varying at the rate of the radiated pulses, which may be 2000 per second, the voltage on the grid 50 is a steady voltage varying smoothly with variations in the range to the particular remote target.

The received echo pulses have a variation in intensity at the rate of 20 to 30 cycles per second due to rotation of the antenna 1. This variation, however, affects alike the portions of the echo received during the two apertures. Since the variations in potential of conductor 49 are due to the difference in these portions, they are not materially affected by the 20 cycle variations.

*Orientation control equipment*

As was previously explained, the beam of pulses projected by the antenna 1 and parabola 2 in the direction 5 is rotated about the axis 6 by the motor 4 at a rate of, for example, 20 revolutions per second. If the target be directly in line with the axis 6, echoes received therefrom are of equal intensity during all parts of the rotation of the beam. If the target be in any other direction, however, then the intensity of the received echo varies cyclically at the 20 cycle rate, the echo being more intense when the beam is directed more closely at the target and being less intense when directed to a position 180° in its rotation away from the target. Thus the echo pulses vary in this cyclic fashion and the cyclical variation has phase relation dependent upon the direction of the remote target. Thus, as the target is directly above the axis 6, the echo is more intense when the beam 5 is directly above the axis 6 and the cyclic variation has a certain time phase relation. If the target be at the right of the axis 6, this phase relation is displaced 90°. If the target be below the axis 6, it is displaced 180°, etc. Thus the echo pulses which appear upon resistances 90 and 87 vary in intensity in this cyclic fashion.

The potential on the resistance 90 is supplied through a condenser 100 to the grid 101 of the left-hand triode of discharge device 96. This triode is a simple amplifier having its anode connected to the positive bus through resistance 97 and its cathode connected to ground through resistance 98. The variations in potential on resistance 90 are reproduced upon the anode and hence upon resistance 97 of this device with reversed polarity.

The cyclic variations in potential on resistance 87 are supplied through condenser 99 and resistance 100a to a resistance 103, the right-hand side of condenser 99 being also connected to ground through a resistance 104.

The potential on resistance 97 is also supplied to this resistance 103 through resistances 105 and 106, the point between these resistances being connected together and to ground through resistance 107. Thus the potential on resistance 103 varies as the algebraic difference of the potentials on resistances 87 and 90 or as the sum of the echo pulses received during the B and C apertures. Thus the potential on resistance 103 varies cyclically as the intensity of the entire echo pulse selected by device 46. Resistances 100a and 106 are of high value to isolate the two networks supplying voltage to resistance 103 from the right-hand grid circuit of device 96 and from each other.

This potential is amplified by the right-hand triode of the device 96. This triode has its anode likewise connected to the positive bus through resistance 108 and its cathode connected to ground through resistance 109 shunted by capacitance 110. This triode is an amplifier which, in effect, is tuned to amplify these 20 cycle variations thereby to reproduce upon resistance 108 the 20 cycle variations in amplified form. These 20 cycle variations are supplied through potentiometer 113 and resistance 114 to the right-hand grid of device 115. This device 115 has a cathode connected to ground through a resistance 116 and two anodes, each having an associated grid. Thus it operates as two separate triodes. The two anodes are connected to the positive bus through respective resistances 117 and 118. The amplified 20 cycle variations appear upon resistance 117 and they are supplied to the left-hand grid through condenser 119 and resistance 120 where they are amplified by the left-hand side of the device 115. Thus the 20 cycle variations appear upon both resistances 117 and 118 but in balanced relation 180° out of phase with each other. These voltages are utilized to control the orientation of the axis 6 of the equipment to maintain the equipment oriented at the remote target.

The manner in which the right-hand triode of device 96 is arranged to produce greater amplification for the 20 cycle variations than at other frequencies, or is, in effect, tuned to the 20 cycle frequency, will now be explained. It will be seen that this device is provided with a feedback path comprising two resistance capacitance phase shifting networks in cascade, the first comprising the capacitance 123 and the resistance 124 and the second comprising the capacitance 125 and the resistance 103. Each of these phase shifting circuits is capable of shifting the phase of the 20 cycle oscillations which appear upon the anode by something less than, but in the neighborhood of, 90° and thus the total phase shift between the anode and the control electrode is a very large angle somewhat less than 180°. Since this phase shift is not 180°, the device is not regenerative but amplifies to a greater extent the 20 cycle variations than other frequencies and has a characteristic between output voltage and applied frequency which is peaked in the fashion of a resonance curve of a tuned amplifier.

The 20 cycle alternating voltage between the two anodes of device 115 is supplied between two slip rings 133 and 134 of a commutator rectifier mounted on the shaft 3. These slip rings are each connected to respective oppositely disposed semicircular commutator segments 135 and 136 of this rectifier. These segments cooperate with two brushes 137 and 138 disposed 90° apart about the periphery of the circle of the commutator segments, one in the horizontal plane and the other in the vertical plane. Each of these brushes is connected to ground through a respective one of condensers 139 and 140. Due to the rectifying action of the commutator rectifier a charge is developed on each of these condensers having a magnitude and polarity dependent upon the phase of the alternating electromotive force applied between the slip rings. The charge on condenser 140 has a polarity and magnitude dependent upon the relation between the direction of the target and the axis 6 in the vertical plane. The charge on condenser 139 varies in the same way with respect to the horizontal plane.

The voltage on these two condensers 139 and 140 is amplified by respective direct current amplifiers 143 and 144, which may comprise amplidyne equipment, and is supplied to the respective motors 16 and 17 with proper polarity to rotate the orientation of the system in the different planes to maintain axis 6 directed at the target.

Receiver gain control

Discharge devices 300 and 303 are connected in an automatic gain control circuit for controlling the amplification of the received echoes in the receiver 20.

The received echo pulses are subject to very rapid fading. This may be due to changes in the attitude of the reflecting surfaces producing the echo, as due to movement thereof. This is particularly true when such surfaces are the surfaces of a remote aircraft in flight. Accordingly, it is necessary that the automatic gain control equipment be capable of sufficiently rapid action to vary the gain of the receiver to counteract this rapid fading. At the same time it should not respond to the 20 cycle variation in the received signal produced by rotation of the antenna 1 to change the gain of the receiver. The received echo pulses which appear upon resistance 90 are supplied through resistance 304 to the control electrode of the discharge device 300 the anode of which is connected through resistance 305 to a variable tap on resistance 306, the latter being connected between positive bus and ground. Variations in potential on resistance 305 produced by current flowing between the anode and cathode of the discharge device are supplied back to the control electrode 302 thereof through two phase shifting networks, the first comprising capacitance 307 and resistance 308 and the second comprising capacitance 309 in parallel with resistance 310 and in series with resistance 313. These two phase shifting networks are connected in cascade between the anode of device 300 and the control electrode, each being capable of producing a phase shift of something near but less than 90°. These networks are so proportioned, however, that the discharge device 300 has substantially uniform amplification at frequencies below approximately 10 cycles and substantially zero amplification above that frequency, as at the 20 to 30 cycle frequency produced by rotation of the antenna 1. Thus the potential on resistance 305 may vary at a frequency up to about 10 cycles per second, which is as rapid as any fading effect to be eliminated, and it is not subject to variations produced by rotation of the antenna. These variations are amplified by the discharge device 303, which is connected to act in the manner of the usual cathode follower, the cathode being connected to ground through a large resistance 312 and its anode being connected to the positive bus through a resistance 314. The potential on resistance 312 is supplied over the conductor 315 to the receiver 20 to control the gain of that receiver. This may be effected, for example, by supplying the screen grids of the electron discharge devices of that receiver with the potential of the conductor 315, the cathodes thereof being connected to ground in the usual way.

*Range indication equipment*

The range indication equipment, in addition to the cathode ray device 23, is illustrated in the lower central portion of Fig. 1 and comprises a revolution counter 42 calibrated in terms of distance, geared to shaft 163 and a rotating index 43 provided on that shaft and cooperating with a circular cooperating scale about the shaft. These devices are operated in response to variations in the length of the A pulse.

It will be remembered that at times other than during the A pulse, current flows from the positive bus 55 through resistance 54, switch 53, left side of discharge device 36 and resistance 60 to ground, this current being interrupted during the period of the A pulse and therefore for periods dependent upon the range to be indicated. Resistance 54 is connected in one arm of a bridge circuit and variations in the effective potential thereon due to variations in length of the A pulses disturb the balance of the bridge and bring about the indication of range on the range indicators 42 and 43.

This bridge comprises resistances 154, 155, 54, 156 and 157 and a diode 158. The lower terminal of resistance 155 is connected to ground and thus current flows constantly through resistances 154 and 155. The lower terminal of resistance 157 is connected to a contact 159 variable along resistance 155. This contact is carried by a screw threaded member 160 mounted upon a screw threaded shaft 163 driven by a motor 164 through a differential gear device 165.

Condenser 170 is connected across the galvanometer arm of the bridge and prevents wide variations in potential across this arm when diode 158 is nonconducting.

When current flows in resistance 54 and the left side of discharge device 36, the anode potential of diode 158 drops below the potential maintained on the cathode by condenser 170 and therefore the diode becomes nonconducting. When this current is interrupted the potential on resistance 54 is reduced, increasing the anode potential of diode 158 causing current to flow through that device and thence through resistances 156, 157, contact 159 and the lower portion of resistance 155 to ground. Thus current flows in pulses through the right side of the bridge, each pulse being of the duration of the A pulse.

The opposite electrodes of condenser 170 are connected to control electrodes 173 and 174 of an electron discharge device 175. This condenser 170, aided by the condenser 176 in shunt with resistance 154 and the condenser 177 in shunt with that portion of resistance 155 above contact 159, operates to smooth the pulse variations which appear across the condenser 170 so that a steady potential difference exists across this diagonal of the bridge whenever contact 159 is in such a position that the bridge is not balanced. Of course, when the bridge is balanced no potential exists across condenser 170 and when potential does exist across condenser 170 it may be of either polarity and of an intensity dependent upon the degree of unbalance of the bridge. This potential is applied between the two control electrodes 173 and 174 in device 175. Oscillations of, for example, 2,000 cycles generated by a crystal oscillator 178 are supplied over conductor 179 to the two anodes of the discharge device 175 through primary windings of transformers 180 and 183. Thus when current flows in either of the anodes of device 175, electromotive force is supplied by either transformer 180 or 183 between the cathode and respective anode of a duodiode 184. The anodes of these diodes are connected together through the respective windings of the transformers 180 and 183 and a resistance 185 the midpoint of which is connected to the cathode of device 184 and the opposite portions of which are by-passed by suitable condensers 186 and 187 to smooth out the alternating variations in the rectified electromotive force produced on this resistance. This potential on resistance 185, which may be of either polarity, is supplied through resistances 188 and 189 across resistances 190 and 193 the latter of which are each respectively shunted by smoothing condensers 194 and 195.

The point between resistors 190 and 193 is connected to the cathode of discharge device 196. This discharge device has two anodes each associated with a respective grid, the grids being connected to the opposite extremities of resistances 190 and 193. These anodes are connected together through equal resistances 197 and 198 the point between which is connected to a source of positive potential, indicated as the cathode of a full wave rectifier 199 the anodes of which are connected to the point between resistances 190 and 193. Alternating electromotive force of, for example, 60 cycles may be applied between these rectifier anodes for rectification thereby. The left-hand anode of device 196 is grounded and the right-hand anode is connected through a switch 400 to the input of a servo-amplifier 401.

A unidirectional potential of one polarity or the other dependent upon the direction of unbalance of the bridge appears between the two anodes of the discharge device 196 and is supplied to the servo-amplifier 403 where it is amplified and supplied to the amplidyne generator 404, which generates a unidirectional electromotive force with respect to ground having a polarity dependent upon the direction of unbalance of the bridge and an intensity dependent upon the extent of the unbalance. This voltage is supplied to the motor 164 which operates to drive the shaft 163 through the differential 165 thereby to rotate shaft 163 to move the contact 159 in such a direction as to balance the bridge. Of course, as soon as the bridge is balanced the potential on condenser 170 disappears and the motor 164 stops.

The circuit described including the discharge devices 174, 184, and 196 possesses the important advantage of extremely reliable operation in producing zero voltage at the input of servo-amplifier 403 when the voltage between control electrodes 173 and 174 is zero notwithstanding that the circuit has extremely high gain or amplification.

Variations in the length of the A pulse flowing in resistance 54, smoothed out by the condensers 170, 176 and 177 produce the unbalance in the bridge which results in operation of the motor to move the contact 159 to a position such that the unbalance disappears. In this way the contact 159 is maintained in a position on resistance 155 varying linearly with range.

Condensers 170 and 176 comprise a capacitance across the diode arm of the bridge thereby maintaining substantially constant voltage across that arm during the intervals when the diode is non-conducting. The upper terminal of the bridge is the bus 55 which is at ground alternating potential. These condensers maintain the terminals of the bridge to which conductors 343 are connected at substantially constant potential with respect to ground while diode 158 is nonconducting. It has been found that transient effects in the bridge are reduced by the use of capacitances 170 and 176 located as illustrated. These undesired transient effects result from effects such as variations in the supply voltage, variations in the position of contact 159 on resistance 155, variations in range to the remote object, etc.

If the repetition rate be 2,000 pulses per second, then the constants of the bridge may desirably have the following values, for example:

Resistance 54=6,000 ohms
Resistance 156=50,000 ohms
Resistance 157=50,000 ohms
Resistance 154=3,000 ohms
Resistance 155=3,000 ohms maximum 2,678 ohms being included in the portion above contact 159 at maximum range.

Capacitance 176=4 microfarads
Capacitance 170=2 microfarads

The indicator 42 is simply a counter arranged to count the revolutions of the shaft 163 and to count down as well as up. Thus if this indicator be initially adjusted to indicate a desired number of units of distance when a remote target to which the equipment responds is at the corresponding number of units of distance away, its reading remains in agreement with the movements of the target to and from the equipment. Distance in terms of a fraction of a unit is indicated on the scale cooperating with index 43, which rotates about a circumference with rotation of the shaft 163.

Manual control of range indication

If switches 400 and 52 be operated to the left, then the control electrode 50, which controls the duration of the A pulse, is connected to the right-hand anode of the discharge device 196 and this anode is disconnected by switch 400 from the servo-amplifier 403. The bridge 154, 155, 54, 156, 157 may now be unbalanced by operating hand crank 405 connected to the gear 166 of the differential 165 thereby moving contact 159 along resistance 155. The resulting unbalance of the bridge produces a potential of a corresponding magnitude and polarity on the right-hand anode of device 196 with respect to ground. This potential is supplied through switch 52 to the control electrode 50 in discharge device 36 and thus varies the length of the A pulse generated by this generator thereby rebalancing the bridge. This in turn controls the time of occurrence of the aperture pulses B and C and thus determines the range from which echoes are selected by the echo selector 44, 46. Of course the deflection 27 seen on the cathode ray oscillograph moves to the right and left in accordance with rotation of the crank 405. Thus if the operator observes a particular deflection in the upper line 24 on the cathode ray oscillograph corresponding to an indication which he desires to select, he rotates the crank 405 until the deflection 27 agrees with the deflection to be observed. He then throws switches 400 and 52 to the right and the equipment automatically follows the variations in range of the selected echo.

Horizontal deflection equipment

The rectangle 33 of Figs. 1 and 2 represents the equipment utilized to supply a sawtooth voltage between the horizontal deflection electrodes 200 of the cathode ray device 23. This sawtooth voltage is, of course, synchronous with the pulses produced by the pulser 61 and which are supplied over conductor 203 and condenser 204 to the cathode 205 of a diode comprising said cathode and anode 206. This cathode is connected to ground through a resistance 207 and the anode 206 is connected through a resistance 208 to a conductor 209 connected to the negative side of a source of operating potential, not shown, which conductor is below ground by approximately 150 volts. The negative pulse from the pulser drives the cathode 205 negative, allowing a pulse of current to flow through the diode and the resistance 208, thereby driving the grid of the right-hand triode in discharge device 213 negative and interrupting the current in that device for a short interval. The right-hand anode of device 213 is connected to the positive bus 55 through a resistance 214 and its associated cathode is connected to the negative bus 209 through a variable resistance 215 and a second resistance 216. Reduction of current in the right-hand triode of device 213 reduces the current in resistances 215 and 216 thereby driving in the negative direction the potential on the control electrode 217 of device 218 for a short interval. This device has a single cathode 219 and two anodes 220 and 223 each being separated from the cathode by two grids. As the potential of the grid 217 varies in the negative direction, current in the anode 220 decreases and by reason of the drop in current in resistance 224 the anode potential simultaneously increases. This increase in potential is supplied through condenser 234 to the grid 235 in device 213 driving that grid positive and causing curent to flow in resistance 236 and anode 237. The drop in potential on resistance 236 is applied to grid 239 to maintain that grid negative during the entire sweep of the ray from left to right.

The interruption of current flowing in the right-hand anode and cathode of device 213, as just described, cannot drive the grid 217 immediately to the voltage of the negative bus because of the presence of condenser 225 which now starts to charge. The charging current flows in resistances 215 and 216 maintaining a voltage thereon during the charging of the condenser, this voltage gradually reducing as the condenser charges, thereby reducing the current in anode 220 and causing the anode potential to rise. The presence of condenser 225 between the anode 220 and grid 217 produces a degenerative action in this tube which results in the anode voltage rising substantially linearly with time and substantially independently of the characteristics of this discharge device over the region of the characteristic where the gain is high.

The anode 220 is coupled to the grid 226 associated with the opposite anode 223 through the resistance path 227 to an intermediate point of which the grid 226 is connected. Thus as the anode 220 goes positive, the potential of the grid 226 likewise varies in the positive direction, increasing the current in anode 223 and in resistance 228, thereby linearly reducing the potential on the anode 223. Thus the potentials on the two anodes 220 and 223 vary in opposite sense by like amounts in a linear relationship. In other words, these anodes operate in balanced relation. These anodes are connected to the respective conductors 230 and 233, which, in turn, are connected to the respective horizontal deflecting electrodes 200 of the cathode ray device 23. This potential variation deflects the ray from the left side of the screen to the right.

During this sweep to the right, condenser 234 changes from the source of operating potential, the charging current flowing through resistance 224, 240 and 243 and maintaining a potential on grid 235 with respect to its cathode such that current flows in resistance 236 to maintain the right-hand section of device 213 non-conducting. When current ceases in anode 220, the charging of condenser 234 ceases and the potential on resistance 240 disappears. This interrupts the current in anode 237 since the grid 235 now falls to the potential of the point between resistances 242 and 243. When this occurs the potential on grid 239 again varies in the positive direction permitting current to flow through this triode and through resistance 214, 215 and 216 which drives the grid 217 in the positive direction increasing the current in resistance 224 and reducing the potential on anode 220 in linear relation with time. The linearity is increased again by the degenerative action on the discharge device due to the condenser 225 between the anode and control electrode 217. This anode potential variation is, of course, applied to the control electrode 226 and appears in opposite sense on the anode 223. These latter variations deflect the ray from the right-hand side of the screen to the left. These deflections of the ray of the cathode ray device may be horizontally centered on the viewing screen of that device by proper adjustment of variable resistance 227' which controls the bias on grid 226.

Means are provided whereby the ray is on during the deflection from left to right and is extinguished during the deflection from the right to the left. This means comprises the right-hand triode in device 244.

When the potential of anode 223 varies in the negative direction during the deflection of the ray from the left side to the right, its negative variation is supplied through condenser 245 to the control electrode of the right-hand triode in device 244. This has no effect since this device is already nonconducting by reason of the previously accumulated bias potential on cathode resistance and capacitance combination 262.

When anode 223 varies in the positive direction, the grid 261 is driven positive and the anode potential drops driving the control electrode 246 negative and extinguishing the ray during the sweep from right to left.

*Vertical deflection and identification equipment*

Signal potential is applied between the vertical deflecting electrodes 247 of the cathode ray device. This signal is supplied from the receiver through conductor 40, amplifier 248 and amplifiers 249 and 250 all in cascade. The potentials of the anodes 257 and 258 of the latter two amplifiers vary in opposite relation. These anodes are connected through condensers 259 and 260 to the vertical deflecting electrodes 247 of the cathode ray device. Since these potentials vary in opposite phase in accord with the received echo pulses, the ray is deflected in the vertical direction during its swing from left to right and produces upon the fluorescent screen of the cathode ray device the vertical deflections in the trace indicated at 24.

Of course, in this trace the vertical deflections correspond to each remote object producing echo pulses, these deflections occurring in positions from left to right dependent upon the range to each of the remote objects, i. e. in space sequence corresponding to the time sequence in which the echoes are received.

Means are also provided to produce upon the screen an identification of a particular one of these echo pulses which is received during the B and C aperture pulses. This is effected by an additional amplifier 263 to the grid of which a pulse is supplied from the B and C pulse generators 38, 39. Thus a connection 264 extends from the cathode of the device 39 to the control electrode of amplifier 263 through condenser 265 during the B and C aperture pulses. When either side of device 39 is conducting, current flows therethrough and through resistance 266 causing a rise in potential on the cathode. This rise in potential drives the grid of amplifier 263 positive reducing the voltage on its anode. This negative variation in voltage, which is supplied to the control electrode 267 of amplifier 249, produces a corresponding variation in anode voltage which produces a downward deflection of the ray in the cathode ray device as indicated at 27 on the screen. This downward deflection 27 thus identifies the particular echo, which may be that indicated at 26, which is received during the B and C apertures.

Of course, the time of occurrence of this echo indicated at 26 and the aperture pulse indicated at 27 depends upon the range to the remote object producing the echo and as that range varies these two deflections vary across the screen from left to right or vice versa in accordance with the position of the remote target.

It will be noticed that the received echo pulses are supplied to the control electrode 267 through amplifier 248 and that the B and C aperture pulses are supplied to this same control electrode through amplifier 263. These amplifiers are arranged to be rendered operative alternately so that the echo pulses are displayed during one deflection of the cathode ray device to the right and the aperture or target marker pulse is displayed during the next deflection to the right, and so on alternately throughout the operation of the equipment. Of course, since the pulses are radiated at the rate of 2,000 cycles per second, these deflections occur at that rate and a continuous indication of both of these deflections appears upon the screen.

The means for rendering the two amplifiers 248 and 263 operative alternately comprises an electron discharge device 270. This device comprises two triodes arranged within the same envelope and each arranged when conductive to render the other nonconductive. The suppressor grids of amplifiers 248 and 263 are connected through respective condensers 290 and 293 to the anodes of these respective triodes. Thus as the potentials of these two anodes alternately rise and fall, the amplifiers 248 and 263 become alternately operative.

The cathodes of the two triodes in device 270 are connected to ground, the anodes are connected to the positive bus 55 through respective resistances 274 and 275. The anode 276 of one triode is connected to the control electrode 277 of the other triode through a resistance 278 shunted by a condenser 279, and similarly the anode 280 of the other triode is connected to the control electrode 281 of the one triode through a resistance 283 shunted by a condenser 284. The two control electrodes 277 and 281 are connected to the negative bus 209 through respective resistances 285 and 286.

The arrangement is such that when current flows in either of these triodes its anode potential is reduced thereby driving negative the control electrode of the opposite triode and rendering that triode nonconducting, this condition remaining until reversed by action of device 287 presently to be described.

Device 287 is a duodiode having a pair of anodes each of which is connected to one of the control electrodes 277 and 281 and a cathode connected to ground through resistance 288. This cathode is also connected through a condenser 289 and conductor 290 to the right-hand anode of device 213.

Let us assume, for example, that current is flowing through resistance 274 and the left-hand triode in device 270. Anode 280 is therefore at low potential driving the grid 281 of the right-hand triode negative with respect to ground and interrupting current in the right-hand triode. Anode 276 is therefore at high positive voltage tending to drive the grid 277 positive. This grid, however, does not become substantially more positive than ground potential because of the flow of grid current through the resistance 278. Condenser 279 therefore is charged to substantially the full voltage of the source, or 300 volts. Anode 280 is at low potential dependent on the drop in the left-hand triode. Resistances 283 and 286 are so proportioned that condenser 284 is charged to about one-third of the voltage on condenser 279 or 100 volts. The left-hand anode of device 287, which is connected to the grid 277, is substantially at ground potential while the right-hand anode of device 287 is strongly negative with respect to ground.

When the potential on the right-hand anode of device 213 varies in the positive direction at the beginning of the sweep of the cathode ray from left to right, the cathode of the device 287 is driven positive. This has no effect since that device is already nonconducting. At the beginning of the sweep from right to left, however, the potential of the right-hand anode of device 213 reduces, driving the cathode of duodiode 287 strongly negative with respect to ground by reason of the charge in condenser 289. Current then flows in both anodes of device 287 through their respective connections to the positive bus 55, one connection comprising the resistance capacitance combination 278, 279 in series with resistance 275 and the other connection comprising the resistance capacitance combination 283, 284 in series with resistance 274. This drops the potential on both grids 277 and 281 below cutoff and down to substantially the cathode potential of the duodiode. The currents in the resistances 274 and 275 are unequal, however. This is apparent because of the unequal charges on condensers 279 and 284 since the difference in voltages existing between the positive bus and cathode of the duodiode and the respective voltages of condensers 279 and 284 must exist on the respective resistances 275 and 274 and produce current therein. Upon termination of the sweep from right to left the cathode of the duodiode is raised to approximately ground potential interrupting the current in duodiode 287.

The currents in resistances 274 and 275, however, are not instantaneously interrupted because of the stray capacitances between the anodes 280 and 276, and connections thereto, to ground, into which these currents continue to flow at exponentially decreasing rates. The potentials of the anodes 280 and 276 and the grids connected thereto through the respective combinations 283, 284 and 278, 279 vary in potential exponentially. The potential of the grid 281 which is connected to the resistance 274, which, as previously mentioned, carries the greater current, rises more rapidly than does the potential of grid 277 and therefore causes current to flow in anode 276 before current flows in anode 280. This current in resistance 275 drops the voltage on grid 277 and maintains that triode cut off.

This reversed condition of the triodes is maintained until the beginning of the next sweep from right to left when the cathode potential of duodiode 287 is again reduced below ground potential, when the current conditions in the two triodes of device 270 are again reversed. In this way the amplifiers 248 and 263 are rendered alternately operative by the potential supplied to their suppressor electrodes 290 and 293 and thus the echo pulses appear during one sweep from left to right and the aperture pulses during the next sweep, and so on alternately.

The capacitance of condensers 279 and 284 should be sufficiently great that the potential thereon is not materially affected by the current flowing in the duodiode during the switchover period. At the same time the time constants of the combinations 278, 279 and 283, 284 should be short relative to the repetition period of the radiated pulses.

It will be observed that current flowing in the anode of amplifier 263 flows through resistance 272, 273 and 266, only the first two of which are in the anode circuit of amplifier 248. Also the control electrode 271 of amplifier 263 is connected to a variable contact 268 on a variable resistance 269 connected between the negative bus 209 and ground. Thus this amplifier has a negative bias applied to its control electrode variable manually. By variation of this contact 268 on resistance 269 the potential on the anode 263 during the time when this device is operative may be either higher than, equal to, or lower than the potential on the anode of amplifier 248 during the time when it is operative. Thus the trace 25 on the viewing screen produced by amplifier 263 may be made to appear below the trace 24 as shown in the circle V, or it may coincide with the trace 24, or it may appear above the trace 24 as shown in the circle V'. Some observers prefer the display of these traces as shown in the circle V'. It will be recalled that the downward deflection of the trace produced by the B and C aperture pulses is produced by two separate pulses occurring adjacent in time. This results in the inverted V-shaped form which appears at the bottom of this deflection. When the echo is accurately centered in the B and C apertures, this inverted V may be made to fit over or straddle the top of the deflection 26 produced by the echo thereby affording accurate observation of the range.

*Fig. 4 and variable pulse rate*

Fig. 4 shows equipment which may be substituted for the equipment represented by the rectangle 301 in Fig. 1. When employing the equipment illustrated in the rectangle 301 of Fig. 1, it is preferable that the radiated pulses have a comparatively constant frequency. For this reason the crystal oscillator 178 shown in the rectangle 301 is employed to control the frequency of the radiated pulses being connected to the pulser over conductor 311.

In the equipment of Fig. 4 a satisfactory indication of range is obtained even though the repetition rate of the pulses may vary over a wide range, as from 500 pulses per second to 2,000 pulses per second and even though the rate of repetition be somewhat irregular as is likely to be the case in a pulser of the sparker type or interval in which the one between pulses is determined by a rotating commutator. In such pulsers the exact time of occurrence of any radiated pulse may vary from its predetermined time position in the wave of pulses in either direction at random from pulse to pulse by amounts varying in magnitude over a considerable range and without any predictable law of variation. This indicating means comprises the revolution counter 42 and index 43 cooperating with the shaft 163 driven by motor 164 which controls the balance of a bridge of somewhat different character from that shown in Fig. 1. This bridge is associated with the A pulse generator represented by the discharge device 36a. This generator is similar to that of Fig. 1, but the structure is likewise somewhat varied to improve its operation.

The device 36a comprises two triodes the cathodes of which are connected together and through a resistance 60a to ground. The anodes are connected through respective resistances 316 and 317 to the positive 300-volt bus 55. The left-hand control electrode 57a of this device is also connected to the positive bus through resistance 58a and through condenser 67a to the right-hand anode of the device 36a. Thus the left-hand triode is conductive, passing current through resistance 60a, which in turn biases the right-hand triode beyond cutoff and interrupts current therein. The A pulse bus 37 over which the A pulses are supplied to the B pulse generator is connected to the left-hand anode of the device 36a as in the case of device 36 in Fig. 1.

Triode 318 takes the place of discharge device 64 of Fig. 1, having the negative pulses from the pulser 61 applied to its cathode over conductor 63. These negative pulses cause current to flow in the right-hand triode of device 318 and in resistance 317. This reduces the potential on the right-hand anode of device 36a and, through the charge on condenser 67a, drives the control electrode 57a strongly negative interrupting the current in the left-hand triode of device 36a. Since the potential on resistance 60a disappears, current again flows in the right-hand triode of device 36a, thereby maintaining the anode of this right-hand triode at low potential even after termination of the pulse received from the pulser. Conductor 37 is now at high positive potential, this being the beginning of the A pulse.

After a time equal to the duration of the A pulse, condenser 67a discharges through resistances 58a and 317 to a point such that the left-hand triode of device 36a again becomes conducting. When this occurs, the potential on resistance 60a interrupts the current in the right-hand triode, the anode potential of which rises maintaining the grid 57a positive. This is the termination of the A pulse.

As was pointed out in connection with the A pulse generator of Fig. 1, the duration of the A pulse is controlled by the potential supplied to the control electrode 50a over conductor 49 of Figs. 2 and 1, through switch 52 and resistance 28'. The potential on this grid controls the extent to which the right-hand triode of device 36a becomes conducting and hence the degree of discharge of condenser 67a required before it again becomes nonconducting. Thus it controls the duration of the A pulse.

The potential on grid 50a is varied by the integrator and reduces with range becoming negative at short ranges. This variation is linear for ranges above about a thousand yards but to maintain the linearity for ranges below a thousand yards certain precautions are necessary in the A pulse generator.

As the range reduces, the A pulses become shorter approaching zero for zero range. But these short pulses always have a length corresponding to the voltage on the right-hand anode of device 36a during the A pulse. This is true because this is the voltage which determines the time required for condenser 67a to discharge sufficiently to terminate the A pulse. This voltage, of course, varies with these small ranges. Now the right-hand anode of device 36a passes small current during these small ranges when its grid bias potential is very large and these anode potential variations occur in a nonlinear portion of the anode current grid voltage characteristic of the device. This nonlinearity produces undesired nonlinearity between the grid voltage supplied to this device and range.

This undesired nonlinearity is largely avoided by maintaining large current in the right-hand triode of device 36a during the A pulses so that the variations in the potential on its anode occur on the linear portion of the anode current, grid voltage characteristic. Of course, these variations at small ranges must be small, approaching zero at zero range notwithstanding this large anode current.

This is accomplished by use of the diode 319 the cathode of which is maintained at a potential of about 200 volts above ground and the anode of which is connected directly to the right-hand anode of device 36a. When the right-hand triode of device 36a is nonconducting its anode potential rises to, for example, 200 volts. At this time, diode 319 becomes conducting, passing current through resistance 317 and preventing further increase in anode potential. If this resistance 317 be 25,000 ohms, the diode current may be four milliamperes producing 100 volts drop on resistance 317. Now when a negative pulse from pulser 61 is received on the cathode of triode 318, this device becomes conducting and passes additional current through resistance 317. This increases the drop in that resistance sufficiently to interrupt current in the diode 319 and to drive grid 57a in the negative direction. The removal of the four milliampere diode current from resistance 317 causes the potential of the source to be effective to produce a corresponding four milliampere current in the right-hand triode. In other words, this current of four milliamperes is alternately transferred between the right-hand triode of device 36a and diode 319. Of course the current in the triode is greater than four milliamperes by the amount necessary to drive the grid 57a negative by an amount corresponding to the range is determined by the potential on the grid 50a. In this way the small potential variations on the right-hand anode of device 36a occur in the linear portion of the anode current grid voltage characteristic and maintain the duration of the A pulse linear with respect to the voltage supplied to the control electrode 50a from conductor 49.

The use of diode 319 produces the further important advantage that the A pulse is terminated more abruptly at short ranges. Were this device not employed the potential of the right-hand anode of device 36a would rise due to interruption of a small current in resistance 317 which current continues until the distributed capacity between the anode and ground becomes charged. This charge takes place at an exponentially decreasing time rate. This is also true when diode 319 is employed but now the current in resistance 317 is large and the portion of it required for charging of the distributed capacity is insignificant, which means that the A pulse is terminated abruptly.

The A pulse appears on resistance 60a as a reduction in voltage thereon. This reduction in voltage reduces the positive voltage on the control electrode of triode 320 interrupting current therein and causing a rise in anode voltage on diode 321 the cathode of which is connected through a direct current ammeter 322 and condenser 323 to ground. The anode of this diode is connected through resistances 324 and 325 to a variable tap 326 on a potentiometer 327 between ground and the positive terminal 328 of a source of operating potential which may be of 700 volts. The cathode of the triode 320 is connected to the positive terminal of a source 329 the negative terminal of which is connected to ground. When triode 320 is conducting the potential of the anode of diode 321 is negative with respect to the potential of its cathode due to the previously accumulated charge on condenser 323 and diode 321 is nonconducting. When triode 320 is rendered nonconducting during the A pulse the anode of diode 321 rises to a potential positive with respect to its cathode and the diode passes current, this current flowing into condenser 323 and charging that condenser by an amount corresponding to the duration of the A pulse.

The bridge previously referred to comprises this condenser 323 and a similar condenser 330 of equal capacity the positive electrodes of which are connected together through two parallel resistance paths, the first path comprising variable resistances 331, 332 and 333 and fixed resistance 334 and the other path comprising resistances 335, 336 and 337, a variable point on the resistance 336 being connected to ground through a resistance 338. Discharge devices 339 and 340 comprise an electronic switching arrangement controlled by a multivibrator 341 operating at the frequency of the radiated pulses to supply a fixed charge from the 700 volt source through discharge device 339 and the opposite arms of the bridge into condenser 342 and then to dissipate that charge in discharge device 340 at the repetition rate of the transmitted pulses. In this way a fixed amount of charge is supplied to each of condensers 323 and 330 after each radiated pulse.

If the A pulse be of zero duration so that zero charge is applied through the diode 321 to the condenser 323 and if the portions of the resistance path 331, 332, 333, 334 opposite contact 159 be equal, then the current flowing into condenser 342 produces equal charges in condensers 323 and 330 and the potential between conductors 343 is zero. That is, the bridge is balanced. These conductors 343 lead to the opposite control electrodes of the amplifier 175 shown in Fig. 1, which operates in connection with its associated rectifiers 184 and 199, amplifier 196, servo-amplifier 403 and amplidyne 404 to control the motor 164 of Fig. 4. If, as assumed, the length of the A pulse is zero, corresponding to zero range, then no charge is added to condenser 323 by diode 321 and contact 159 balances the bridge in its extreme right-hand position. As the range increases and charges are added to the condenser 323 periodically, of magnitude corresponding to the length of the A pulse, then the bridge is unbalanced and a potential appears between conductors 343 of the magnitude and polarity corresponding to the unbalance. This operates through the equipment shown in Fig. 1 to rotate the motor 164 in the direction to reestablish the balance, that is, to move contact 159 to the left until the fixed charges supplied by the current flowing into condenser 342 divide between condensers 330 and 323 in proportion to maintain zero voltage between the conductors 343. Thus the indicating devices 42 and 43 arranged on the shaft 163 indicate range as before.

Considering in greater detail the operation of the switching mechanism 339, 340 and the multivibrator 341, it will be noted that the multivibrator comprises the discharge device 348 having its cathode connected through a resistance 349 to the negative 150 volt bus and having an anode 350 connected to the 300 volt positive bus 55 through a resistance 353. This device also has a second anode 354 connected through a resistance 355 to the positive terminal 328 of the 700 volt source. The control electrode 356, associated with anode 354, is connected through resistance 357 to the positive bus 55 and through condenser 358 to the anode 350 and to the anode of device 359 the cathode of which is connected to ground through resistance 360. This cathode is also connected through switch 363, in its upper position, and conductor 364 to the conductor 63 from which negative pulses from the pulser 61 are received.

Normally current flows through resistance 355 and the left-hand anode 354 of the device 348 and discharge device 339 is nonconducting, its control electrode 365 being negative with respect to its cathode. This current flowing in resistance 349 interrupts the current in anode 350 so that this anode is at high positive potential. This anode 350 is connected through condenser 366 to the control electrode of discharge device 340 and thus that device is normally conducting and comprises a short circuit across condenser 342. Condenser 342 is therefore completely discharged.

Upon occurrence of a negative pulse from the pulser, which is supplied over conductors 63 and 364 to the cathode of device 359, device 359 becomes conducting and passes current through resistance 353. The increased potential across resistance 353 drives the control electrode 356 sufficiently negative with respect to the cathode to interrupt the current in the anode 354. The reduction in potential on cathode resistance 349 permits an increase of current between anode 350 and its cathode, which in turn maintains the grid 356 negative. Thus the anode 350 is now at reduced potential and device 340 is therefore nonconducting. Anode 354 is at increased potential and device 339 is conducting. Condenser 342 now charges to a fixed value from the 700 volt source through discharge device 339 and the bridge.

After the time required for condenser 358 to discharge through resistances 357 and 353, the left-hand section of device 348 again becomes conducting dropping the potential on its anode 354. Thus device 339 again becomes nonconductive. The flow of current in resistance 349 interrupts the current in anode 350 thereby causing the potential of this anode and grid 356 to rise. This drives the grid of device 340 positive and that device again becomes conductive. The charge on condenser 342 is now dissipated in the discharge device 340.

This cycle of operations occurs upon receipt of each negative pulse from the pulser and equal pulses of charging current flow through device 339, condenser 342, contact 159 and the opposite arms of the bridge to contact 370 and resistance 338 to ground. This charging current produces charges in the two condensers 330 and 323 having a ratio to each other dependent upon the position of contact 159 on resistance 332. As previously stated, if this contact 159 be at its extreme right-hand position corresponding to zero range, then the A pulses are of zero duration and the charges applied to condenser 323 through diode 321 are zero. The charging current of condenser 342 then produces equal charges in the two condensers 330 and 323 and zero voltage appears between conductors 343. At any range above zero, however, additional charges are added to condenser 323 during each A pulse from diode 321, this charge being of magnitude corresponding to the length of the A pulse. These charges increase the potential on condenser 323 with respect to that on condenser 330 and unbalance the bridge resulting in potential between conductors 343 causing the motor 164 to be driven to move contact 159 to the left to such a position that the potential on condenser 330 is brought up to that on condenser 323 and the potential between conductors 343 disappears.

In this way contact 159 is moved backward and forward along resistance 332 as the length of the A pulse, and hence the range, increases and decreases. The indicators 42 and 43 thus continuously indicate the range of the remote object the echo from which is selected by the echo selection equipment previously described.

It will be observed that this periodic charging of condensers 323 and 330 through discharge device 339 and the periodic charging of condenser 323 through diode 321 go on at the repetition rate of the radiated pulses and that variation in that repetition rate does not affect the balance of the bridge. The charge put into condensers 323 and 330 through device 339 is dependent upon the capacity of condenser 342 and is therefore not dependent on the repetition rate. Also the charge put into condenser 323 through diode 321 is dependent solely upon the length of the A pulse and is independent of the time between receipt of the echo and the time of transmission of the next pulse. It is therefore independent of variation in the repetition rate and thus independent of any variations in the effective value of the current wave flowing in device 320 produced by variation in the repetition rate. Thus the range indicators 42 and 43 accurately indicate range quite independently of the frequency of the radiated pulses.

That the position of contact 159 on resistance 332, and hence the range indication, varies linearly with change in the length of the A pulse can readily be shown mathematically.

Let $R_1$ represent the resistance between contact 159 and condenser 323, $R_2$ the resistance between contact 159 and condenser 330, and $Q$ the quantity of electricity, or of current, flowing into condenser 342 to charge that condenser on each cycle of operation of discharge devices 339 and 340. This current divides between condensers 330 and 323, the quantity $$\frac{QR_1}{R_1+R_2}$$

flowing into condenser 330 and the quantity $$\frac{QR_2}{R_1+R_2}$$

flowing into condenser 323.

Condenser 323 has an additional charge flowing into it on each cycle of operations from diode 321. If we call this charge $Q_1$, then $$Q_1 = \frac{Et}{R}$$

where E is the voltage between the 700 volt terminal of the operating source and the condenser, R is the resistance between these same points, and $t$ is the length of the A pulse.

Thus the total charge in condenser 323 is $$\frac{QR_2}{R_1+R_2}+Q_1$$

or for the condition of balance of the bridge $$\frac{QR_1}{R_1+R_2}=\frac{QR_2}{R_1+R_2}+Q_1 \qquad (1)$$

The quantity Q is equal to the product of the voltage E between the 700 volt terminal of the source and the variable contact 159 on potentiometer 332 and the capacity C of the condenser.

Substituting for Q and $Q_1$ in Equation 1, and transposing, we have $$EC\frac{R_1-R_2}{R_1+R_2}=\frac{Et}{R} \qquad (2)$$

$$RC\frac{R_1-R_2}{R_1+R_2}=t \qquad (3)$$

$$\frac{RC}{R_1+R_2}[2R_1-(R_1+R_2)]=t \qquad (4)$$

From Equation 4 it will be seen that the quantities $R_1+R_2$ and RC are fixed values irrespective of the position of the contact 159. This means that the quantity $R_1$ is dependent linearly on the quantity $t$, or the length of the A pulse. Thus contact 159 must move along resistances 332 in linear relation to the length of the A pulse.

The A pulses are supplied to the bridge arrangement through switch 373 in its upper position and the negative pulses from the pulser are supplied to the device 359 through switch 363 in its upper position. These switches are arranged for unicontrol with a further four-position switch 401. These switches are utilized when the apparatus is being adjusted for operation.

In adjusting the apparatus for operation the switches 373, 363 and 401 are operated to their lower, or fourth, positions. Switches 373 and 363 in their lower positions do not change connections but switch 401 places a short between conductors 343. The equipment comprising discharge devices 175, 184, 196 may now be adjusted to produce zero output across voltmeter 405 in Fig. 1 by varying contact 406 on resistance 185. Preferably this adjustment is made with switches 400 and 52 in their left-hand positions.

With switches 373, 363 and 401 in any of their other positions the short between conductors 343 is removed. In their third positions the anode of diode 321 is connected to contact 370 and this diode is therefore nonconducting, or in a condition corresponding to minimum or zero range. Switch 363 connects device 359 to multivibrator 375. This multivibrator is controlled by a crystal oscillator 376 having a frequency of, for example, 2000 cycles and produces a square wave of that frequency which is differentiated by condenser 402 and resistance 360 to control device 359 exactly as do the pulses from pulser 61 which are supplied over conductors 63 and 364.

With the switches in these positions the bridge is first balanced with respect to transients or variations in repetition rate of the transmitted pulses. This is effected by varying contact 370 on resistance 336 until a position is found where switch 407 may be operated without any effect on the reading of meter 405 in Fig. 1. This balance occurs when the product of resistance between contact 370 and condenser 323 and the capacitance of that condenser equals the product of the resistance between contact 370 and condenser 330 and the capacitance of that condenser. In effect the operation of switch 407 produces transients in the bridge and the balance is so effected as to prevent such transients from adversely affecting the operation of the bridge. During this adjustment switches 400 and 52 are in their left-hand positions.

Switches 400 and 52 are now operated to the right and motor 164 now operates to balance the bridge. Resistances 331 and 333 are now varied oppositely, by movement of contacts thereon which are unicontrolled, to values such that this balance occurs when the indicators 42 and 43 indicate zero range.

Switches 373, 363 and 401 are now operated to their second position. Switch 373 now disconnects the anode of diode 321 from triode 320 and this diode becomes continuously conducting, a condition corresponding to maximum range, which for a 2,000 cycle repetition rate is 81,900 yards.

Switch 363 still maintains device 359 connected to the multivibrator 375.

The motor 164 now operates to balance the bridge and the reading of indicators 42 and 43 is noted.

A further error enters in the operation of the equipment which may now be corrected. This error arises due to the presence of distributed capacity between the control electrode 365 of device 339 and the cathode thereof. This control electrode becomes negative with respect to the cathode at the same time when device 340 becomes conductive to discharge condenser 342. This discharge, however, does not take place instantaneously with the result that this distributed capacity becomes charged from condenser 342 to a potential equal to the potential between the anode of device 340 and the anode 354 when device 340 is conducting. This charging current flows through the bridge. If this charging current were proportional to the quantity E of Equation 2, it would not introduce error. This current is not strictly proportional to E, however, but expressed mathematically, it has an additive constant independent of E. Therefore to balance the bridge independently of E it is necessary that the charge supplied to condenser 323 through diode 321 be affected in the same way. This is effected by adjustment of contact 326 on potentiometer 327 until no change in range indication occurs in response to operation of switch 407. At the same time resistance 325 is adjusted until the reading corresponds to the crystal frequency, or to maximum range, as, in the example mentioned, 81,900 yards.

The switches 373, 363 and 401 are now operated to their first, or operating, positions. The bridge is now balanced for indication of range.

The indications are now accurate except for time delays in the receiver and other portions of the equipment. Such errors may be removed by directing the equipment at a fixed target and adjusting contacts on resistances 331 and 333 to remove any known error, or by directing the equipment at a target of known range and adjusting these resistances until the indicators read correctly.

Triode 408 is employed for the purpose of reducing a certain error in the range indication which arises due to delay in the termination of the A pulse on resistance 60a. That is, at the end of the A pulse the potential on resistance 60 increases. Certain distributed capacitive effects, however, prevent its rising instantaneously to its full value and instead it rises at an exponentially decreasing rate. The potential on the left-hand anode of device 36a drops at a corresponding rate but the initial drop is sufficient to trigger the B pulse generator comprising device 38 of Fig. 1. Triode 408 has a control electrode connected through condenser 409 and conductor 410 to the left-hand anode of device 38 in the B pulse generator so that when that anode rises in potential the grid of triode 408 is driven positive and that triode becomes conducting, increasing the current in resistance 324 at a more rapid rate than the increase in triode 320. This more rapid increase in current in resistances 324 and 325 reduces the constant error in the range indication caused by the slow rise in voltage on resistance 60.

It has been found in the operation of the bridge of Fig. 4 that temperature variations affecting the capacitance of condensers 323 and 330 adversely affect the accuracy of the indications produced. It is therefore necessary that means be employed to maintain the capacitance of these condensers constant irrespective of temperature variations, or for periodic readjustment of these capacitances.

Fig. 5—Short aperture pulses

Fig. 5 shows equipment which may be substituted for the equipment indicated in the rectangle 413 of Fig. 2, where aperture pulses of extremely short duration are desired. This equipment comprises a discharge device 414 employed as a B pulse generator and a discharge device 415 employed as a C pulse generator, these discharge devices being coupled through condensers 417 and 418 respectively to the control electrodes of the triode 46, which is employed as the echo selector as described in connection with Fig. 2. The cathode of this triode 46 is connected to the anode of a discharge device 419 which is substituted for the triode 44 of Fig. 2. The received echoes are supplied over conductor 41 to the control electrode 420 of the device 419. The A pulse is supplied over conductor 37, which extends to the A pulse generator, through condenser 423 to the control electrode of the discharge device 424 the anode of which is coupled through condenser 425 to the control electrode 426 of the B pulse generator. The discharge device 424 operates as an amplifier and polarity reverser. The B pulse generator comprises a pair of discharge devices having a common cathode connected to ground through resistance 427 and condenser 428 and respective anodes each connected through respective resistances 429 and 430 and a common resistance 433 to the 300 volt positive bus 55. The left-hand anode 434 is connected through a condenser 435 to the control electrode 436 associated with the right-hand anode, the latter being connected through resistance 430 and resistance 433 to the positive bus. A bias potential is supplied to the control electrode 426, associated with anode 434, from a potentiometer comprising resistances 438, 439 and 440 across the source of operating potential so that the left-hand section of discharge device 414 is nonconducting. The anode 434 is therefore at high potential and the control electrode 436 is positive with respect to the cathode rendering the right-hand section of this device conducting.

At termination of the A pulse the control electrode of amplifier 424 is driven negative thereby reducing current in the anode of this device, thereby, through condenser 425, driving the grid 426 positive causing current to flow in resistance 429, anode 434, and resistance 427, this current being of very short duration and flowing into condenser 428. Due to the charge on condenser 435 grid 436 is driven negative interrupting current in the right-hand anode. This is the beginning of the B pulse.

The duration of the B pulse now, unlike the B pulse generator of Fig. 2, is not determined by the discharge period required for condenser 435 but rather is determined by the rate of charge of condenser 425. When this condenser sufficiently charges, the control electrode 426 again becomes negative with respect to the cathode and interrupts the current in anode 434, this anode rising in potential and rendering the right section of device 414 conductive so that its anode potential again drops. The length of this charging period and hence the length of the B aperture may be varied by variation of resistance 440. The left-hand grid of device 46 is connected to this right-hand anode and is thus positive for the duration of the B pulse.

It will be seen that a pulse of the duration of the B pulse exists on the input grid 426 of the B pulse generator 414. This device 414 operates, however, to produce a more abrupt rise and fall in potential on the left-hand grid of echo selector 46 than that occurring on the grid 426.

The arrangement as thus described possesses certain advantages where it is desired to use aperture pulses of extremely short duration, as for example durations of a fraction of a microsecond or of periods corresponding to distances of from 20 yards to 120 yards for example.

As was previously pointed out, when the A pulses are very short, corresponding to short ranges, they do not terminate abruptly because of certain distributed capacity effects. When the grid of device 424 is driven negative, however, at the end of the A pulse, the B pulse is initiated substantially instantaneously. Condenser 423 starts to charge through resistance 443 but the B pulse is terminated by charging of condenser 425 before the potential of device 424 is materially affected by the charging of condenser 423. Thus the B pulse has a duration shorter than the time constant of the circuit comprising resistance 443 and condenser 423, which circuit acts to differentiate the A pulse.

In this respect the operation of the device is somewhat different from the operation of the B pulse generator shown in Fig. 2. In that figure the voltage variation at termination of the A pulse is differentiated by condenser 32, resistance 32' and producing a sharp negative pulse on the grid of device 38 which is shortly terminated, the grid potential again tending to vary in the positive direction due to charging of condenser 32. Current in resistance 74 causes the left-hand section of device 39 to become conductive and the charge on condenser 76 then maintains the left-hand control electrode of device 38 negative for the duration of the B pulse. The duration of the B pulse, however, can never be made shorter than the negative voltage transient applied to the left-hand control electrode of device 38 by reason of the interruption of the A pulse irrespective of any constants which may be chosen for condenser 76 and its charging circuit.

The B pulse generator of Fig. 2 is a highly satisfactory one where the B pulse may be of a duration corresponding to a distance in excess of 150 yards. When extremely short apertures of a duration corresponding to 20–150 yards, however, are required, the arrangement of Fig. 5 is to be preferred.

The right-hand section of device 414 passes a larger current through resistance 427 into condenser 428 than does the left-hand section, which means that the potential drop on resistance 427 is reduced during the B pulse. This potential drop is supplied through condenser 444 to the control electrode of discharge device 415 in the C pulse generator. This generator is of substantially the same circuit construction as the A pulse generator, differing principally in that the resistance 437 is divided into two resistances having a condenser 445 connected between ground and the point between the two resistors 437. Normally the right-hand section of the discharge device 415 is conducting and the left-hand section is nonconducting. On termination of the B pulse, however, the left-hand control electrode becomes positive with respect to the cathode by reason of the increased potential on resistance 427, rendering the left-hand section of device 415 conducting. This in turn drives the right-hand control electrode negative by reason of the charge on condenser 446 and interrupts current in the right-hand section. After a time required for condenser 446 to discharge through resistance 437, the right-hand control electrode again becomes positive and the right-hand section passes current dropping its anode potential. This current flowing in resistance 447 interrupts the current in the left-hand anode. This is the termination of the C pulse.

Condenser 445 is employed for the purpose of shortening the time required for condenser 446 to discharge to an extent sufficient to render the right-hand section of the triode conducting thereby to terminate the C pulse in a time comparable to the length of the B pulse. At the same time the resistance 437 may be of high value to maintain the grid current flowing in the right-hand grid in device 415 at a suitably low value.

The discharge device 415 is one which carries a large anode current and has sufficiently small distributed capacity that the C pulse generated by this device may be made of a short duration substantially equal to the length of the B pulse.

Conductor 410 is shown in Fig. 5 from which B pulses may be supplied to discharge device 408 of Fig. 4 where equipment of Fig. 4 is employed, for the purposes described in connection with Fig. 4.

In the equipment of Fig. 5, discharge device 448 is employed in place of the diode 45 and resistance 73 of Fig. 2, this discharge device having its cathode and suppressor grid connected to the anode of discharge device 419 and its anode connected to the positive bus 55 through voltage dropping resistance 449. The screen grid 450 of this device is connected directly to the positive bus and to ground through resistances 453 and 454 the latter of which is shunted by a bypass condenser 456. The control electrode 455 of this device is connected to the point between resistances 453 and 454 the latter of which is so proportioned that the control electrode is at about 120 volts above ground, or at the potential at which it is desired to maintain the anode of device 419.

It will be observed that the cathode of the device 448 is entirely disconnected from the circuits of the B and C pulse generators there being no connection such as that existing between the anode of diode 45 in Fig. 2 and the circuits of the B and C pulse generators in that figure. This is of advantage in that it facilitates their construction to produce B and C pulses of extremely short duration.

The discharge device 448 has the further advantage in that it maintains the anode of the device 419 at suitably high potential and at a relatively constant potential irrespective of the amount of current flowing in the device 419 during the A pulse. That is, the intensity of the signal received over conductor 41 on the grid of device 419 may vary widely during the A pulse and this signal controls the current flowing in devices 448 and 419 during that time. If this current flows through substantial resistance between the anode of device 419 and the positive bus 55 the anode potential may vary over a considerable range. Any variation in the anode voltage of device 419, however, in the negative direction renders the cathode of device 448 more negative with respect to the control electrode 455 thereby rendering that device more highly conductive. In this way a regulating action is secured tending to maintain the anode potential of device 419 substantially constant irrespective of the intensity of the received signal.

The control electrodes of device 46 are connected in Fig. 5 through respective grid resistances 465 and 466 to a point between resistances 467 and 468, the latter being connected in series across the 300 volt source. The resistances 467 and 468 are proportioned to render the grids of device 46 negative sufficiently to interrupt current in this device at all times except during the positive pulses received thereon from the respective B and C pulse generators. Device 46 must carry the full anode current of device 419 while its grid is negative. This prevents the flow of grid current in device 46 during the B and C pulses. The intensity of the B and C pulses produces sufficient rise in the potential of the cathode of device 46, and hence the cathode of device 448, to cause device 448 to become nonconductive during the B and C apertures.

The use of the short aperture pulses as above described is highly advantageous in my invention because the duration of the B and C apertures comprises the total time during which pulses are received which control the range indicating bridge of my invention. All other echoes, interference or noise effects are excluded and thus have no effect upon the range indication. These short apertures also reduce the minimum range to which the operation of the range indicating equipment follows the movements of the remote object from which echoes are received.

It will be understood that my system responds to pulses received from remote bodies due to impingement thereon of pulses radiated by the transmitter. Such received pulses may be produced either by reason of reflection from said bodies or by reason of operation of apparatus carried thereby, as, for example, relaying equipment used for identification purposes as in radio recognition apparatus. I, of course, intend by the term "echo" as employed in this specification to include any pulse received from a remote body whether due to reflection therefrom or to operation of apparatus carried thereby in response to pulses radiated by the transmitter of my equipment.

Certain features of the B and C pulse generators, shown in Fig. 5 and described above, are more particularly claimed in my copending application Serial No. 792,899, filed Dec. 20, 1947, for "Triggered pulse generator," which is a division of the present application and assigned to the same assignee.

While I have illustrated a particular embodiment of my invention, it will of course be understood that I do not wish to be limited thereto since various modifications both in the circuit arrangement and in the instrumentalities employed may be made, and I contemplate by the appended claims to cover any such modifications as fall within the true spirit and scope of my invention.

What I claim as new and desire to secure by Letters Patent of the United States is:

1. The combination, in a pulse echo system, of means to transmit recurrent pulses and to receive echoes thereof from different remote objects, means to select a desired one of said echoes, said means comprising two parallel connected normally nonconducting electron discharge devices, and a third electron discharge device, said third device being connected in series with said first two devices, means to supply said received echoes to said third device to control the current therein, means to render first one and then the other of said first two devices conductive over short intervals including the time of reception of the echo to be selected, and means to advance or delay the times when said two devices are rendered conductive in accord with the relation between the currents flowing therein during said intervals.

2. The combination, in a pulse echo system, of means to transmit recurrent pulses and to receive echoes thereof from different remote objects, means to select a desired one of said received echoes, said means comprising two parallel connected normally nonconducting electron discharge devices, and a third electron discharge device, said third device being connected in series with said first two devices, means to supply said received echoes to said third device to control the current therein, means to render first one and then the other of said first two devices conductive over short intervals including the time of reception of the echo to be selected, means to advance or delay the times when said two devices are rendered conductive in accord with the relation between the currents flowing therein during said intervals, and means controlled by said last means to produce a continuous indication of the distance from which said selected echo is received during movement of the object producing said selected echo.

3. The combination, in a pulse echo system, of means to transmit recurrent pulses and to receive echoes thereof from different remote objects, means to select a desired one of said received pulses, said means comprising two parallel connected normally nonconducting electron discharge devices, and a third electron discharge device, said third device being connected in series with said first two devices, means to supply said received echoes to said third device to control the current therein, means to render first one and then the other of said first two devices conductive over short intervals including the time of reception of the pulse to be selected, means to advance or delay the times when said two devices are rendered conductive in accord with the relation between the currents flowing therein during said intervals, and means to maintain the load on said third device constant both when said first devices are nonconducting and when either of said first devices is conducting.

4. The combination, in a pulse echo system, of means to transmit pulses and to receive echoes thereof, a pair of electron discharge devices connected in parallel paths, means to maintain said devices nonconducting for an interval after each transmitted pulse and then to render first one and then another of said devices conducting, a third device in series with said two devices, means to supply the received echo to said third device to control the current in said first two devices when conducting, and means to control the duration of said interval in accord with the relation between integrals of the current passed in said two devices while conducting.

5. The combination, in a pulse echo system, of means to transmit pulses and to receive echoes thereof, a pair of electron discharge devices connected in parallel paths, means to maintain said devices nonconducting for an interval after each transmitted pulse and then to render first one and then another of said devices conducting, means to control the current in said two devices in accord with echoes received while conducting, means to integrate the current passed by each device while conducting, means to control the duration of said interval in accord with the relation between the integrals produced by said last means, a bridge adapted to be balanced, means to vary the balance of said bridge in accord with the variations of said interval, means to maintain said bridge in balance, and means controlled by said last means to operate in accord with the distance to the object producing the echo received while said devices are conducting.

6. In combination, a directive radio system, means to radiate periodic pulses and to receive echoes thereof in said system after reflection from remote objects, means to select a desired one of said received echoes, said means comprising means to receive the selected echo over two successive intervals, means to integrate the selected echo over said intervals, means responsive to the relation between the integrals produced by said last means during said two intervals to control the time of occurrence of said intervals to agree with the time of receipt of an echo from a particular remote object, and means responsive to the sum of said integrated electromotive forces to control the orientation of said directive radio system to maintain it oriented at said object during movement thereof.

7. In combination, a directive radio system, means to radiate periodic pulses and to receive echoes thereof in said system during the intervals between said pulses, a pulse receiver connected to said system, means to select a desired one of the echoes received in said receiver, said last means comprising means to receive said pulses from said receiver over two short intervals in succession, means to integrate said pulses over each of said intervals, means to vary the time of occurrence of said intervals in accord with the relation between the two integrals of said pulses corresponding to the respective intervals, means controlled by the sum of said integrals to maintain said system oriented at the object producing said particular echo, and means responsive to one of said integrals to control the gain of said receiver.

8. In combination, a directive radio system, means to radiate periodic pulses and to receive echoes thereof in said system during the intervals between said pulses, a pulse receiver connected to said system, means to rotate the axis of directivity of said system about its axis of orientation whereby echoes received in said receiver from a particular object vary in intensity cyclically at the rate of said rotation, means to receive an echo pulse from said receiver over two short intervals in succession, means to integrate said echo pulse over each of said intervals, means to vary the time of occurrence of said intervals in accord with the relation between the two integrals produced by said last means, means controlled by the sum of the integrated echo pulse received during said intervals to maintain said axis of orientation directed at the object producing the echo received during said intervals, means responsive to the intensity of the electromotive force received during one of said intervals to control the gain of said receiver, and means to render said last means unresponsive to frequencies corresponding to the rate of rotation of said axis of directivity.

9. The combination, in a radio echo system, of means to generate three pulses in succession periodically the first of said pulses being of variable length and the others being of fixed length, means to radiate a pulse on initiation of the first of said pulses and to receive an echo thereof from a remote object during said other pulses, a pair of normally nonconducting electron discharge devices, each having an anode and a cathode and each connected across a source of operating potential through a respective resistance, means to render each of said devices conducting during a corresponding one of said other intervals and to control the current therein in accord with the echo received during said interval, the anode of each of said devices being connected to ground through a series connection of a condenser, a unilateral conducting device and a second condenser in that order, said unilateral devices being poled to be rendered conducting by drop in potential between said anode and cathodes, a resistance between the cathode of one of said unilateral conducting devices and ground, a connection between the anode of said one device and the cathode of the other, and means to control the duration of the first of said pulses by the potential on said last connection.

10. The combination, in a pulse echo system, of a source of operating potential, a pair of electron discharge devices connected in series across said source, each device having an anode, a control electrode and a cathode, the lower potential anode of said pair being connected through a resistance to the cathode of the other device and to the positive terminal of said source, a connection between said anode and the control electrode of the other device to render that device nonconducting when said first device is conducting, a condenser between the anode of said other device and the control electrode of said first device to drive said control electrode of said first device negative when said first device becomes conducting, means to radiate a pulse and thereafter to supply a negative pulse to said last mentioned control electrode whereby said first device is rendered nonconductive and is maintained nonconductive for an interval determined by said condenser, a normally inoperative echo pulse receiver, and means to render said receiver operative during said interval.

11. The combination, in a pulse echo system, of means to transmit recurrent pulses and to receive an echo thereof during two intervals in succession, means to render said receiving means operative during said two intervals, said means comprising two multivibrators connected in cascade, each having a control electrode and including means responsive to a potential variation thereon to supply a pulse to said receiving means to render it operative during the respective interval, the first multivibrator being arranged to supply said potential variation to the control electrode of the other multivibrator on termination of said first interval, means to supply a potential variation to both control electrodes at the beginning of said first interval whereby said first multivibrator produces its response, and means included in said first multivibrator to neutralize said variation on the control electrode of the second multivibrator produced by said last means.

12. In combination, means to transmit recurrent pulses and to receive echoes thereof from a particular remote object, a bridge comprising a source of operating potential, a pair of parallel resistance paths across said source, voltage responsive means connected between intermediate points on said paths the portions of said paths opposite said points comprising four arms of said bridge, a unilateral conducting device in one of said arms, means responsive to transmission of each pulse to reverse the condition of conductivity or nonconductivity of said device and responsive to said echo to produce the opposite reversal of said condition, whereby the average potential across said arm varies with the distance to said object, means to maintain substantially constant the potential of said intermediate point in said path including said unilateral conducting device when said unilateral conducting device is nonconducting, and means controlled by said voltage responsive means to vary a single other arm of said bridge only to maintain said bridge balanced during movement of said object.

13. In combination, means to transmit recurrent pulses and to receive echoes thereof from a particular remote object, a bridge comprising a source of operating potential, a pair of parallel resistance paths across said source, voltage responsive means connected between intermediate points on said paths the portions of said paths opposite said points comprising four arms of said bridge, a unilateral conducting device in one of said arms, means responsive to transmission of each pulse to reverse the condition of conductivity or nonconductivity of said device and responsive to said echo to produce the opposite reversal of said condition, whereby the average potential across said arm varies with the distance to said object, a capacitance connected across said arm including said unilateral conducting device to maintain substantially constant the potential of said intermediate point in said path when said device is nonconducting, and means controlled by said voltage responsive means to vary a single other arm of said bridge only to maintain said bridge balanced during movement of said object.

14. In combination, means to transmit recurrent pulses at a repetition rate subject to variation, means to receive said pulses directly from said transmitter and to receive echoes thereof from a remote object, means to generate a series of range pulses recurring in synchronism with said transmitted pulses and each having a duration determined by the interval between said two received pulses, a movable member, means controlled by said range pulses to move said member to positions corresponding to the length of time between said two received pulses, whereby the position of said member varies with variations in range to said remote object, and means to maintain a linear relation between the position of said member and the distance to said object during variations in said repetition rate.

15. In combination, means to transmit recurrent pulses at a repetition rate subject to variation over a wide range said variations occurring independently of any predictable law of variation, means to receive each pulse directly from said transmitting means and to receive a train of echoes thereof in the interval between said transmitted pulses, means to select one of said echoes received from a particular remote object, means responsive to the duration of time between the pulse received directly from said transmitting means and the selected echo to operate in accord with the range to said object, a bridge, means to vary the balance of said bridge in accord with variations in the time between the transmitted pulses and the selected echo, means automatically to maintain said bridge in balance, and means controlled by said last means to operate in accord with the range to said remote object.

16. In combination, means to transmit recurrent pulses at a repetition rate subject to variation, means to receive an echo thereof from a particular remote object, means to produce a current wave having a pulse initiated simultaneously with transmission of each radiated pulse and terminated substantially simultaneously with reception of the echo from said object whereby the effective value of said current wave varies both with range to said object and with the repetition rate of said transmitted pulses, a movable element, means responsive to said current to position said element in accord with variations in range to said object, and means to prevent variations in repetition rate of said transmitted pulses from affecting the position of said element.

17. In combination, means to transmit recurrent pulses, means to receive an echo thereof during an aperture of time occurring after transmission of each of said pulses by an interval variable in accord with the time in said aperture when said echo is received, a bridge, means to vary the balance of said bridge in accord with variations in said interval, means automatically to maintain said bridge in balance, and means to prevent variations in repetition rate of said recurrent pulses from affecting the balance of said bridge.

18. The combination, in a range indicating system, of a pair of condensers, means to transmit recurrent pulses to a remote object and to receive echoes therefrom at a time corresponding to the range to said object, means synchronous with said last means to supply charges to said two condensers, means to supply an additional charge to one of said condensers, variable in accord with the time interval between transmission of each recurrent pulse and receipt of said echo, means to vary the relation between said charges supplied by said first mentioned charge supply means to said two condensers to maintain equal potential on said two condensers, and means controlled by said last means to operate in accord with the range to said object.

19. In combination, means to transmit periodic pulses and to receive echoes thereof, a pair of electron discharge devices, each having an anode, a control electrode and a cathode, means responsive to current in either device to render the other device nonconducting, means to reverse the condition of conductivity and nonconductivity in said devices upon transmission of each pulse, means to maintain said reversed condition for an interval dependent upon the potential between two electrodes of one of said devices, an echo selector, means to render said echo selector operative to respond to a desired echo during a predetermined interval initiated upon termination of said first interval, means responsive to the time of receipt of a desired echo in said predetermined interval to control the potential between said electrodes thereby to vary the duration of said first interval, a bridge, means to disturb the balance of said bridge in accord with the variations of said interval, and means controlled by said bridge to indicate the distance from which the echo received in said predetermined interval arrived.

20. The combination, in a pulse echo system, of means to transmit periodic pulses and to receive echoes thereof, a pair of electron discharge devices, each having an anode, a control electrode and a cathode, means responsive to current in either device to render the other device nonconducting, means to reverse the condition of conductivity and nonconductivity in said devices upon radiation of each pulse, means to maintain said reversed condition for an interval dependent upon the potential between the control electrode and cathode of one of said devices, an echo selector, means to render said echo selector operative to respond to a desired echo during a predetermined interval initiated upon termination of said first interval, means responsive to the time of receipt of a desired echo in said predetermined interval to control the potential between the control electrode and cathode of said one device, thereby to vary the duration of said first interval, a bridge, means to disturb the balance of said bridge in accord with the variations of said interval, manual means to vary said bridge, and means to disable said time responsive means and to vary the potential between the control electrode and cathode of said one device in response to variation in said bridge, thereby manually to vary the duration of said interval.

21. In combination, means to transmit periodic pulses and to receive echoes thereof from distant objects, means to generate periodically three pulses occurring in succession the first being initiated upon transmission of each of said transmitted pulses and being of variable duration and the second and third being of fixed duration, a balanced bridge, means to supply said first pulses to an arm of said bridge to control the effective potential of said arm, means automatically to maintain said bridge in balance, means responsive to the time of receipt of a desired echo in said second and third pulses to control the length of said first pulses, means to disable said last two means and to vary the balance of said bridge manually, and means responsive to said manual variations in said bridge to produce corresponding variations in length of said first pulses.

22. The combination, in a pulse echo system, of means to transmit periodic pulses and to receive echoes thereof from distant objects, a cathode ray device having a viewing screen, means to indicate said echoes in a first trace across said screen in space sequence corresponding to the time sequence in which they are received, means to select a particular one of said echoes, means to produce a second trace across said screen, means to indicate in said second trace only the position corresponding to the indication in the first trace of the echo selected by said selecting means, and means to control said selecting means to select any of the echoes indicated on said screen and to maintain the position of said indication in said second trace in space agreement with the indication of the echo selected by said selecting means.

23. In combination, means to transmit periodic pulses and to receive an echo thereof over an interval longer than said pulses but short relative to the time between said pulses, means to vary the time of occurrence of said first interval in the period between said pulses, a bridge, means to supply to one arm thereof pulses of length corresponding to the time between any radiated pulse and the beginning of said interval thereafter, means responsive to the time of receipt of an echo in said first interval to vary the time of occurrence of said interval thereby disturbing the balance of said bridge, means manually to disturb the balance of said bridge, and means to control the time of occurrence of said interval in the period between successive radiated pulses in accord with the unbalance of said bridge.

24. In combination, means to transmit recurrent pulses and to receive echoes thereof during the intervals between pulses, a viewing screen, means to indicate said echoes in space sequence on said screen corresponding to the time sequence in which they are received, means to select a particular one of said echoes, means to identify the selected echo on said screen, a bridge, means to vary the balance of said bridge in accord with the time of receipt of the selected echo, means manually to vary the balance of said bridge, and means responsive to said last means to change the echo selected by said selecting means and to correspondingly change the identification produced on said screen by said identifying means.

25. In combination, means to transmit recurrent pulses and to receive echoes thereof, an echo selector, a pulse producer, means to synchronize initiation of pulses produced by said pulse producer with said radiated pulses, means to render said echo selector effective to respond to an echo received during a predetermined interval after termination of the pulse produced by said pulse producer to supply a potential to said pulse producer variable in accord with the time of occurrence of the selected echo in said interval, said pulse producer having means to vary the duration of the pulse produced thereby in accord with said potential, a bridge, means to vary the balance of said bridge in accord with the length of said pulses, means responsive to unbalance of said bridge to produce a potential varying in accord with said unbalance, means to interrupt the potential supplied to said pulse producer by said potential supply means and to supply to said pulse producer potential produced by said last means, whereby the time of occurrence of said interval is controlled by unbalance of said bridge, and means variably to unbalance said bridge.

26. In combination, means to transmit recurrent pulses and to receive echoes thereof, means to select a particular one of said echoes, a cathode ray device having a viewing screen, means to deflect said ray across said screen in two predetermined paths alternately, said ray being deflected in one path after alternate transmitted pulses and in the other path after the intermediate radiated pulses, and means to control said ray during its deflection in one of said paths in accord with all of the echoes received during the respective deflection, and means to vary said ray during its deflection in said other path at the time of receipt of the echo selected by said echo selecting means thereby to indicate on said screen the echo selected.

27. In combination, means to transmit recurrent pulses and to receive echoes thereof, means to select a particular one of said echoes, a cathode ray device having a viewing screen, means to deflect said ray across said screen after each transmitted pulse, and means to modulate said ray during alternate deflections in accord with all echoes received during said deflections, and means to modulate said ray during intermediate deflections only at the time of receipt of the echo selected by said selecting means.

28. In combination, means to transmit recurrent pulses and to receive echoes thereof, means to select a particular one of said echoes, a cathode ray device having a viewing screen, means to deflect said ray across said screen after each transmitted pulse, means to modulate said ray during alternate deflections in accord with all echoes received during said deflections, means to modulate said ray during intermediate deflections only at the time of receipt of the echo selected by said selecting means, and means to separate said alternate deflections to produce distinct traces on said screen, one trace having indications of all echoes received and the other having only a single indication identifying the selected echo.

29. In combination, means to transmit recurrent pulses and to receive echoes thereof, means to select a particular one of said echoes, a cathode ray device having a viewing screen, means to deflect said ray across said screen after each radiated pulse, means to modulate said ray during alternate deflections in accord with all echoes received during said deflections, and means to produce a predetermined modulation of said ray only during intermediate deflections at a time agreeing with the operation of said echo selecting means.

30. In combination, means to transmit recurrent pulses and to receive echoes thereof, means operative over a short interval of the time when echoes are received to select a desired one of said echoes, a cathode ray device having a viewing screen, means to deflect the ray of said device over a predetermined path on said screen after each transmitted pulse and during the interval when echoes are received, means to deflect said ray from said path during alternate deflections in accord with all echoes received during said deflections, means to deflect say ray from said path during the intermediate deflections only at the time of operativeness of said selecting means, and means to cause said alternate and intermediate deflections to produce distinct traces on said screen.

31. In combination, means to transmit recurrent pulses and to receive echoes thereof, means operative over a short interval of the time when echoes are received to select a desired one of said echoes, a cathode ray device having a viewing screen, means to deflect the ray of said device over a predetermined path on said screen after each radiated pulse and during the interval when echoes are received, means to deflect said ray from said path in accord with received echoes, means to produce a predetermined deflection of said ray from said path at a time agreeing with the period of operativeness of said echo selecting means, means to render said last two means alternately operative at the rate of said radiated pulses, and means to separate the alternate deflections of said ray on said screen whereby two traces are produced on said screen, one indicating all received echoes and the other indicating the time of operativeness of said echo selecting means.

32. The combination, of means to transmit recurrent pulses and to receive echoes thereof, means operative over a short interval of the time when echoes are received to select a desired echo, said means including means to produce a pulse synchronous with said interval, a cathode ray device having a viewing screen and horizontal and vertical deflecting means, means to supply a sawtooth wave to one of said deflecting means synchronous with said radiated pulses to deflect said ray across said screen during the reception of said echoes, means to supply said echoes to the other deflecting means, means to supply said pulse produced by said second mentioned means to said other deflecting means, and means to render said last two means operative over alternate deflections produced by said sawtooth wave.

33. The combination, of means to transmit recurrent pulses and to receive echoes thereof, means operative over a short interval of the time when echoes are received to select a desired echo, said means including means to produce a pulse synchronous with said interval, a cathode ray device having a viewing screen and horizontal and vertical deflecting means, means to supply a sawtooth wave to one of said deflecting means synchronous with said radiated pulses to deflect said ray across said screen during the reception of said echoes, means to supply said echoes to the other deflecting means, means to supply said pulse produced by said second mentioned means to said other deflecting means, means to render said last two means operative over alternate deflections produced by said sawtooth wave, and means to separate the traces produced by alternate and intermediate deflections whereby two traces appear on said screen one having indications in accord with echoes and the other having an indication of the time of operativeness of said echo selecting means.

34. In combination, an electron discharge device having an anode, a cathode and a control electrode, means to transmit recurrent pulses and receive echoes thereof in the intervals between said pulses and to supply said echoes between said control electrode and cathode, a source of operating potential, three additional discharge devices one having a control electrode, said cathode being connected to the negative terminal of said source and said anode being connected to the positive terminal of said source through the anode-cathode space of one and then another of said three additional devices in succession, means responsive to the time when a desired echo to be selected is received to render one and another of the other two of said additional devices conductive over successive intervals, and means controlled by said last means to render the cathode potential of the third of said three devices sufficiently positive with respect to its control electrode to render that device nonconductive.

35. The combination, in an echo system, of means to transmit recurrent pulses, means to receive said pulses during the interval between transmission thereof, and means to maintain said last means disabled except during a brief aperture of said interval, said means comprising a pair of electron discharge devices connected as a multivibrator, a condenser, means to supply a pulse through said condenser to one of said discharge devices to reverse the current conditions therein to initiate said aperture, and means to vary the charge on said condenser to terminate said aperture after an aperture of time shorter than the timing period of said multivibrator.

36. The combination, in an echo system, of means to transmit recurrent pulses, means to receive said pulses during the interval between transmission thereof, and means to maintain said last means disabled except during a brief aperture of said interval, said means comprising a pair of electron discharge devices connected as a multivibrator, means to generate a pulse of variable length, an electron discharge amplifier coupled through a condenser to said multivibrator, means to supply the voltage variation due to termination of said pulse through said amplifier to said multivibrator to reverse the current conditions in said pair of discharge devices to initiate said aperture, and means again to reverse the current conditions in said pair of discharge devices to terminate said aperture after a time determined by the capacity of said condenser.

37. The combination, in a pulse echo system, of means to transmit recurrent pulses, means to receive said pulses, means to maintain said last means inoperative for an interval after transmission of any pulse and then to render it operative for a brief aperture of time, said means comprising a pair of discharge devices, each having an anode, a cathode and a control electrode, a condenser connected between the anode of one of said devices and the control electrode of the other device, means to control said receiving means in accord with the current in said other device, a differentiating circuit, means to supply a pulse of variable length through said differentiating circuit to the control electrode of said first device thereby to vary the current in said second device to initiate said aperture, and means to produce an opposite variation in said current in said second device to terminate said aperture at a time determined by said condenser and shorter than the time constant of said differentiating circuit.

WILLIAM C. HAHN.

REFERENCES CITED

The following references are of record in the file of this patent:

UNITED STATES PATENTS

| Number | Name | Date |
| --- | --- | --- |
| 2,050,059 | Koch | Aug. 4, 1936 |
| 2,055,883 | Terry | Sept. 29, 1936 |
| 2,098,695 | Southwick | Nov. 9, 1937 |
| 2,189,549 | Hershberger | Feb. 6, 1940 |
| 2,223,666 | Harrison | Dec. 3, 1940 |
| 2,275,016 | Koch | Mar. 3, 1942 |
| 2,312,761 | Hershberger | Mar. 2, 1943 |
| 2,324,314 | Michel | July 13, 1943 |
| 2,345,932 | Gould | Apr. 4, 1944 |
| 2,355,363 | Christaldi | Aug. 8, 1944 |
| 2,368,448 | Cook | Jan. 30, 1945 |
| 2,419,205 | Feldman | Apr. 22, 1947 |
| 2,419,239 | White | Apr. 22, 1947 |
| 2,419,541 | De Rosa | Apr. 29, 1947 |

FOREIGN PATENTS

| Number | Country | Date |
| --- | --- | --- |
| 552,072 | Great Britain | Mar. 22, 1943 |

Certificate of Correction

Patent No. 2,467,208.  April 12, 1949.

WILLIAM C. HAHN

It is hereby certified that errors appear in the printed specification of the above numbered patent requiring correction as follows:

Column 5, line 15, for the word "pulses", second occurrence, read *pulser*; column 17, line 2, for "curent" read *current*; column 21, line 44, for "interval" read *one*; line 45, for "one" read *interval*;

and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*